(12) United States Patent
Javidi et al.

(10) Patent No.: US 11,200,691 B2
(45) Date of Patent: Dec. 14, 2021

(54) SYSTEM AND METHOD FOR OPTICAL SENSING, VISUALIZATION, AND DETECTION IN TURBID WATER USING MULTI-DIMENSIONAL INTEGRAL IMAGING

(71) Applicant: University of Connecticut, Farmington, CT (US)

(72) Inventors: Bahram Javidi, Storrs, CT (US); Satoru Komatsu, Kanagawa (JP); Adam Markman, Orange, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 16/887,843

(22) Filed: May 29, 2020

(65) Prior Publication Data

US 2020/0380710 A1    Dec. 3, 2020

Related U.S. Application Data

(60) Provisional application No. 62/855,248, filed on May 31, 2019.

(51) Int. Cl.
  *G06T 7/557* (2017.01)
  *G06T 7/521* (2017.01)
  (Continued)

(52) U.S. Cl.
  CPC ............ *G06T 7/557* (2017.01); *G06K 9/0063* (2013.01); *G06K 9/00758* (2013.01);
  (Continued)

(58) Field of Classification Search
  CPC ........... G06T 7/557; G06T 7/521; G06T 7/97; G06T 7/536; G06K 9/00758;
  (Continued)

(56) References Cited

U.S. PATENT DOCUMENTS 4,555,179 A    11/1985 Langerholc et al.
5,299,035 A    3/1994 Leith et al.
(Continued)

FOREIGN PATENT DOCUMENTS

CN    101894276 A    11/2010
CN    101894276 B    9/2012
(Continued)

OTHER PUBLICATIONS

Javier Traver et al., "Human gesture recognition using three-dimensional integral imaging", Oct. 2014, 2014 Optical Society of America, vol. 31, No. 10, pp. 2312-2320 (Year: 2014).*
(Continued)

*Primary Examiner* — Chan S Park
*Assistant Examiner* — Daniel C Chang
(74) *Attorney, Agent, or Firm* — Michael Best & Friedrich LLP

(57) ABSTRACT

Systems and methods for optical sensing, visualization and detection in media (e.g., turbid media; turbid water; fog; non-turbid media). A light source and an image sensor are positioned in turbid media or external to the turbid media with the light source within a field of view of the image sensor array. Temporal optical signals are transmitted through the turbid media via the light source and multiple perspective video sequence frames are acquired via the image sensor array of light propagating through the turbid media. A three-dimensional image is reconstructed from each frame and the reconstructed three-dimensional images are combined to form a three-dimensional video sequence. The transmitted optical signals are detected from the three-dimensional video sequence by applying a multi-dimensional signal detection scheme.

33 Claims, 15 Drawing Sheets

(51) Int. Cl.
  *G06K 9/00* (2006.01)
  *G06T 7/00* (2017.01)
  *G06T 7/536* (2017.01)

(52) U.S. Cl.
  CPC .............. *G06T 7/521* (2017.01); *G06T 7/536* (2017.01); *G06T 7/97* (2017.01)

(58) Field of Classification Search
  CPC .... G06K 9/0063; G06K 9/2036; G06K 9/209; G06K 9/00624
  See application file for complete search history.

(56) References Cited

U.S. PATENT DOCUMENTS

| | | | |
|---|---|---|---|
| 5,371,368 | A | 12/1994 | Alfano et al. |
| 6,072,494 | A | 6/2000 | Nguyen |
| 6,128,003 | A | 10/2000 | Smith et al. |
| 6,215,587 | B1 | 4/2001 | Alfano et al. |
| 7,009,700 | B2 | 3/2006 | Dubois et al. |
| 7,242,449 | B1 | 7/2007 | Yamazaki et al. |
| 8,044,999 | B2 * | 10/2011 | Mullen .................. G01S 7/4912 348/67 |
| 8,836,793 | B1 | 9/2014 | Kriesel et al. |
| 9,185,391 | B1 | 11/2015 | Prechtl |
| 10,419,688 | B2 | 9/2019 | Gurgov |
| 2002/0179717 | A1 | 12/2002 | Cummings et al. |
| 2003/0182013 | A1 | 9/2003 | Moreas et al. |
| 2005/0126505 | A1 | 6/2005 | Gallager et al. |
| 2006/0114553 | A1 | 6/2006 | Laudo |
| 2007/0083535 | A1 | 4/2007 | Zilliacus et al. |
| 2008/0018966 | A1 | 1/2008 | Dubois et al. |
| 2008/0317200 | A1 | 12/2008 | Lecomte et al. |
| 2009/0160985 | A1 | 6/2009 | Javidi et al. |
| 2010/0060897 | A1 | 3/2010 | Gustafsson |
| 2011/0053693 | A1 | 3/2011 | Wright |
| 2011/0222745 | A1 | 9/2011 | Osterhout et al. |
| 2012/0194649 | A1 | 8/2012 | Javidi et al. |
| 2013/0015236 | A1 | 1/2013 | Porter et al. |
| 2013/0088568 | A1 | 4/2013 | Nolte |
| 2013/0221084 | A1 | 8/2013 | Doss et al. |
| 2014/0133702 | A1 | 5/2014 | Zheng et al. |
| 2014/0317713 | A1 | 10/2014 | Gadotti |
| 2015/0049343 | A1 | 2/2015 | Shaked et al. |
| 2015/0269427 | A1 | 9/2015 | Kim et al. |
| 2015/0295711 | A1 | 10/2015 | Javidi et al. |
| 2015/0304638 | A1 | 10/2015 | Cho et al. |
| 2015/0347889 | A1 | 12/2015 | Nosaka et al. |
| 2015/0356306 | A1 | 12/2015 | Carter |
| 2016/0153766 | A1 | 6/2016 | Jones et al. |
| 2016/0305883 | A1 | 10/2016 | Betzig et al. |
| 2016/0360186 | A1 | 12/2016 | Javidi et al. |
| 2017/0023472 | A1 | 1/2017 | Pavilion et al. |
| 2017/0227754 | A1 | 8/2017 | Huang |
| 2017/0322410 | A1 | 11/2017 | Watson et al. |
| 2018/0000441 | A1 | 1/2018 | Wang et al. |
| 2018/0024341 | A1 | 1/2018 | Romanowski et al. |
| 2018/0146180 | A1 | 5/2018 | Keesling et al. |
| 2019/0138786 | A1 | 5/2019 | Trenholm et al. |
| 2019/0226972 | A1 | 7/2019 | Javidi et al. |

FOREIGN PATENT DOCUMENTS

| | | |
|---|---|---|
| CN | 108985344 A | 12/2018 |
| WO | WO2020036782 A2 | 2/2020 |

OTHER PUBLICATIONS

Akram et al., "Camera Based Visible Light Communication System for Underwater Applications", Published in IEEE International Conference on Industrial and Information Systems, ICIIS 2017, 6 Pages.

Amer et al., "Enhancing underwater optical imaging by using a low-pass polarization filter", Optic Express vol. 27 No. 2 Jan. 21, 2019, 23 Pages.

Bonin et al.,"Imaging Systems for Advanced Underwater Vehicles",Journal of Maritime Research, vol. VIII. No. 1, 2011, pp. 65-86.

Burguera et al., "Trajectory-Based Visual Localization in Underwater Surveying Missions", Sensors, 15, 2015, pp. 1708-1735.

Cho et al., "Peplography—a passive 3D photon counting imaging through scattering media" Optics Letters vol. 41 No. 22, Nov. 15, 2016 pp. 5401-5404.

Cho et al., "Three-Dimensional Visualization of Objects in Turbid Water Using Integral Imaging", Journal of Display Technology, vol. 6, No. 10, Oct. 2010, pp. 544-547.

Doster et al., "Laguerre-Gauss and Bessel-Gauss beams propagation through turbulence: analysis of channel efficiency", applied optics vol. 55 No. 36, Dec. 20, 2016 pp. 10239-10246.

Dubreuil et al., "Exploring underwater target detection by imaging polarimetry and correlation techniques", Applied Optics vol. 52 No. 5, 2013, pp. 997-1005.

Goodman, "Statistical Optics", Book Published in 2000, 16 pages.

Goudail et al., "Bhattacharyya distance as a contrast parameter for statistical processing of noisy optical images", Optical Society of America, © 2004, pp. 1231-1240.

Hamamatsu, "Photon is Our Business", Book ©2007, 14 Pages.

Javidi et al., "Multidimensional Optical Sensing and Imaging System (MOSIS): From Macroscales to Microscales", Proceedings OP the IEEE, vol. 105 No. 5 May 5, 2017, pp. 850-875.

Kakue et al., "High-speed phase imaging by parallel phase-shifting digital holography", Optics Letters vol. 36 No. 21, pp. 4131-4133.

Kaushal et al., "Underwater Optical Wireless Communication", IEE Access Apr. 11, 2016, pp. 1518-1547.

Khalighi et al., "Underwater Wireless Optical Communications Using Silicon Photo-Multipliers", IEEE Photonics Journal, Jul. 14, 2017, 11 Pgs.

Kullback et al., "On Information and Sufficiency", The Annal of Mathmatatical. Statistics vol. 22 No. 1, 1951, pp. 79-86.

Lathi et al., "Modern Digitial and Analog Communication Systems", Book Oxford University Press 2010, 15 Pgs.

Lin et al., "Radiative transfer simulations of the two-dimensional ocean glint reflectance and determination of the sea surface roughness", Applied Optics vol. 55 No. 6 Feb. 20, 2016, pp. 1206-1215.

Lippman, "Epreuves reversibles donnant la sensation du relief", Journal of Theoretical and Applied Physics, vol. 7 No. 1, 1908, pp. 821-825.

Liu et al., "An underwater acoustic direct sequence spread spectrum communication system using dual spread spectrum code", Frontiers of Information Technology & Electronic Engineering vol. 19 No. 8, 2018, pp. 972-983.

Lopez-Salcedo, "Simple Closed-Form Approximation to Ricean Sum Distributions", IEEE Signal Processing Letters, Apr. 2009, 4 Pgs.

Markman et al. "Three-dimensional object visualization and detection in low light illumination using integral imaging" Optic letters vol. 42, No. 16, Aug. 15, 2017 pp. 3068-3071.

Matoba et al., "Multimodal Imaging Based on Digital Holography", Proceedings of the IEEE vol. 105, No. 5, May 2017, pp. 906-923.

Mollah et al., "Comparative Analysis of Gold Codes with PN Codes Using Correlation Property in CDMA Technology" International Conference on Computer Communication and Informatics Jan. 10-12, 2012, 6 Pgs.

Oiknin et al., "Compressive sensing resonator spectroscopy", Optics Letters vol. 42, No. 1, Jan. 1, 2017, pp. 25-28.

Okoshi, "Three-Dimensional Displays", Proceedings of the IEEE, vol. 68, No. 5, 1980, pp. 548-564.

Palmese et al., "Spread Spectrum Modulation for Acoustic Communication in Shallow Water Channel", University of Connecticut, Paper No. 061215-038, IEEE © 2007, 4 Pgs.

Peng et al., "Underwater Image Restoration Based on Image Blurriness and Light Absorption", IEEE Transactions on Image Processing, vol. 26, No. 4, Apr. 2017, pp. 1579-1594.

Peng et al., "Generalization of the Dark Channel Prior for Single Image Restoration", IEEE Transactions on Image Processing, vol. 27. No. 6. Jun. 2018, 2856-2868.

(56) References Cited

OTHER PUBLICATIONS

Photron, FASTCAM, SA-X2 Datasheets, 2012, 6 pgs.
Proakis, Digital Communication Fourth Edition Book, McGraw-Hill 2000, 12 Pgs.
Proakis, et al. Digital Communication Fifth Edition Book, McGraw-Hill Higher Education, 2008, 15 Pgs.
Refregier et al., "Nonlinear joint-transform correlation: an optimal solution for adaptive image discrimination and input noise robustness", Optics Letters, vol. 19, No. 6, Mar. 15, 1994, pp. 405-407.
Sadaji et al., "Automatic Target Recognition XXVII", Proceedings of SPIE vol. 10202, Apr. 10-11, 2017, 9 Pgs.
Song et al., "ROC operating point selection for classification of imbalanced data with application to computer-aided polyp detection in CT colonography", Int J CARS, 2014, pp. 79-89.
Takai et al., "Optical Vehicle-to-Vehicle Communication System Using LED Transmitter and Camera Receiver", IEEE Photonics Journal vol. 6 No. 5 Oct. 2014, 14 Pgs.
Treibitz et al., "Active Polarization Descattering", IEEE Trans. PAMI, vol. 31, No. 3, 2009, pp. 385-399.
Wu et al., Blue Laser Diode Enables Underwater Communication at 12.4Gbps, Scientific Reports, Published: Jan. 17, 2017, 10 Pgs.
Xia et al., "One million fps digital holography", Electronics Letters vol. 50 No. 23, Nov. 6, 2014, pp. 1693-1695.
Xiao et al., "Advances in three-dimensional integral imaging: sensing, display, and applications [Invited]", Applied Optics Vo. 52 No. 4, Feb. 1, 2013 pp. 546-560.
Zweig et al., "Receiver-Operating Characteristic (AOC) Plots: A Fundamental Evaluation Tool in Clinical Medicine", Clinical Chemistry Vo. 39 No. 4, 1993, pp. 561-577.
Alfalou, A. et al., Optical image compression and encryption methods, Adv. Opt. Photon. 1, pp. 589-636 (2009).
Ando, et al., "Speckle-Learning-Based Object Recognition Through Scattering Media," Opt. Express 23, 33902-3391 (2015) (9 Pages).
Barrera, J. et al., Optical encryption and QR codes: Secure and noise-free information retrieval, Opt. Express 21(5):5373-5378 (2013).
Boening, T. W. Groemer, and J. Klingauf, "Applicability of an EM-CCD for spatially resolved TIR-ICS," Opt. Express 18(13), 13516-13528 (2010).
Carnicer, A. et al., Vulnerability to chosen-cyphertext attacks of optical encryption schemes based on double random phase keys, Opt. Lett. 30, DD. 1644-1646 (2005).
Chan, R. Khoshabeh, K. B. Gibson, P. E. Gill, and T. Q. Nguyen, "An augmented Lagrangian method for total variation video restoration," IEEE Trans. Image Process. 20(11), 3097-3111 (2011).
Chen, H. Wei, and J. Ferryman, "A Survey of Human Motion Analysis Using Depth Imagery" Pattern Recognition Letters, 34, 1995-2006 (2013).
Chen, W. et al., Phase-modulated optical system with sparse representation for information encoding and authentication, IEEE Photon. J. 5, 6900113 (2013).
Chen, Wen, Bahram Javidi, and Xudong Chen. "Advances in optical security systems." Advances in Optics and Photonics 6.2 (2014): 1-37.
Cho et al. "Three-Dimensional Optical Sensing and Visualization Using Integral Imaging," in Proceedings of the IEEE, vol. 99, No. 4, pp. 556-575, Apr. 2011. doi: 10.1109/JPROC.2010.2090114 (Year: 2011).
Cho et al., "Three-dimensional tracking of occluded objects using integral imaging," Opt. Lett. 33, 2737-2739 (2008).
Cho et al.,3D passive Integral Imaging Using Compressive Sensing, Nov. 2012, Optical Society of America, vol. 20. No. 24, pp. 26624-26635.
Cho, Myungjin, and Bahram Javidi. "Three-dimensional photon counting double-random-phase encryption." Optics letters 38.17 (2013): 3198-3201.
Dainty, J. C., "The Statistics of Speckle Patterns," Progress in Optics XIV, North-Holland (1976).
Dubois, F., Automatic spatial frequency selection algorithm for pattern recognition by correlation, Appl. Opt. 32, 4365-4371 (1993).

Frauel, Y. et al., Resistance of the double random phase encryption against various attacks, Opt. Express 15, p. 10253-10265 (2007).
Goudail, F. et al., Influence of a perturbation in a double phase-encoding system, J. Opt. Soc. Am. A 15, pp. 2629-2638 (1998).
Han, L. Shao, D. Xu, J. Shotton, "Enhanced Computer Vision with Microsoft Kinect Sensor: A Review", IEEE Trans. on Cybernetics, 43, 5, 1318-1334 (2013).
Hoshino, F. Okano, H. Isono, and I. Yuyama, "Analysis of resolution limitation of integral photography," J. Opt. Soc. Am. A 15(8), 2059-2065 (1998).
Huffman, David A., A Method for the Construction of Minimum-Redundancy Codes, Proceedings of the IRE (IEEE, 1952), Sep. 1952, pp. 1098-1101.
International Preliminary Reporton Patentability for Application No. PCT/US2019/045477 dated Feb. 25, 2021 (7 pages).
International Search Report and Written Opinion for Application No. PCT/US2019/045477 dated Mar. 5, 2020 (13 pages).
Jang and B. Javidi, "Three-dimensional synthetic aperture integral imaging," Opt. Lett. 27(13), 1144-1146 (2002).
Javidi et al., "Sickle cell disease diagnosis based on spatio-temporal cell dynamics analysis using 3D printed shearing digital holographic microscopy", Optics Express, vol. 26, No. 10, May 2018, 14 pages.
Javidi, B., Nonlinear joint power spectrum based optical correlation, ADDI. Opt. 28, DD. 2358-2367 (1989).
Krizhevsky, I. Sutskever, and G. Hinton, "Imagenet classification with deep convolutional neural networks," in the Neural Information Processing Systems Conference (2012), pp. 1097-1105.
Lawrence, C. L. Giles, A. C. Tsoi, and A. D. Back, "Face recognition: a convolutional neural-network approach," IEEE Trans. Neural Netw. 8(1), 98-113 (1997).
Leith et al. "Imaging Through Scattering Media With Holography," J. Opt. Soc. Am. A9, 1148-1153 (1992) (6 Pages).
LeMaster et al., "Mid-Wave Infrared 3D Integral Imaging at Long Range" J. Display Technology 9(7): 545-551 (2013) [7 pages].
Levin and Q. Zhang, "A global analysis of factors controlling VIIRS nighttime light levels from densely populated areas," Remote Sens. Rev. 190, 366-382 (2017).
Li, Y. et al., Security and encryption optical systems based on a correlator with significant output images, Appl. Opt. 39, pp. 5295-5301 (2000).
Llavador, E. Sánchez-Ortiga, G. Saavedra, B. Javidi, and M. Martinez-Corral, "Free-depths reconstruction with synthetic impulse response in integral imaging," Opt. Express 23(23), 30127-30135 (2015).
Markman et al. "Learning in the dark: 3D integral imaging object recognition in very low illumination conditions using convolutional neural networks" OSA Continuum, 1(2):3068-3071 (2018).
Markman, A., Bahram Javidi, and Mohammad Tehranipoor. "Photon-counting security tagging and verification using optically encoded QR codes." Photonics Journal, IEEE 6.1 (2014): 6800609.
Markman, Adam, and Bahram Javidi. "Full-phase photon-counting double-random-phase encryption." JOSA A 31.2 (2014): 394-403.
Matoba et al., Encrypted optical memory systems based on multi-dimensional keys for secure data storage and communications, IEEE Gire. Dev. Maa. 16, DD. 8-15 (2000).
Matoba, O. et al., Optical techniques for information security, Proc. IEEE 97, pp. 1128-1148 (2009).
Mogensen et al., Phase-Only Optical Encryption, Apr. 2000, Optical Society of America, vol. 25 No. 8, pp. 566-568.
Moon et al., "Identification of Malaria-Infected Red Blood Cells via Digital Shearing Interferometry and Statistical Inference", IEEE Photonics Journal, vol. 5, No. 5, Oct. 2013, 8 pages.
O'Connor et al., "Automatic cell identification and visualization using digital holographic microscopy with head mounted augmented reality devices", Applied Optics, vol. 57, No. 7, Mar. 2018, pp. B197-B204.
Ohbuchi, E. et al., Barcode readers using the camera device in mobile phones, in Proceedings of IEEE 2004 International Conference on Cyberworlds, M. Nakajima, ed. (IEEE, 2004), DD. 260-265.
Okano, H. Hoshino, J. Arai, and I. Yuyama, "Real-time pickup method for a three-dimensional image based on integral photography," Appl. Opt. 36(7), 1598-1603 (1997).

(56) References Cited

OTHER PUBLICATIONS

Perez-Cabre, E. et al., Information authentication using photon-counting double-random-phase encrypted images, Opt. Lett. 36, pp. 22-24 (2011).

Perez-Cabre, Elisabet et al., Photon-counting double-random-phase encoding for secure image verification and retrieval, Aug. 2012, Polytechnic University of Catalonica, Journal of Optics 14.

Petrášek and K. Suhling, "Photon arrival timing with sub-camera exposure time resolution in wide-field time-resolved photon counting imaging," Opt. Express 18(24), 24888-24901 (2010).

Phillips, D. Gruber, G. Vasan, C. Roman, V. Pieribone, and J. Sparks, "Observations of in situ deep-sea marine bioluminescence with a high-speed, high-resolution sCMOS camera," Deep Sea Res. Part I Oceanogr. Res. Pap. 111, 102-109 (2016).

Rawat et al., "Compact and field-portable 3D printed shearing digital holographic microscope for automated cell identification", Applied Optics, vol. 56, No. 9, Mar. 2017, pp. D127-D133.

Refregier, P. et al., Optical image encryption based on input plane and Fourier plane random encoding, Opt. Lett. 20, DD. 767-769 (1995).

Sadjadi and A. Mahalanobis, "Automatic target recognition XXVIII," Proc. SPIE 10648, 106480I (2018).

Shan et al., Application of QR Two-dimension Code Technology in Credits Certification System, Dec. 2013, ACM ICCC '13: Proceedings of the Second International Conference on Innovative Computing and Cloud Computing, pp. 222-224.

Stern, D. Aloni, and B. Javidi, "Experiments with three-dimensional integral imaging under low light levels," IEEE Photon. J. 4(4), 1188-1195 (2012).

Suzuki, H. et al., Experimental evaluation of fingerprint verification system based on double random phase encoding, Opt. Express 14, pp. 1755-1766 (2006).

Tajahuerce, Enrique, and Bahram Javidi. "Encrypting three-dimensional information with digital holography." Applied Optics 39.35 (2000): 6595-6601.

Tanzid et al. "Absorption-Induced Image Resolution Enhancement in Scattering Media," ACS Photonics. 3:1787-1793 (2016) (7 Pages).

Tavakoli, B. Javidi, and E. Watson, "Three dimensional visualization by photon counting computational Integral Imaging," Opt. Express 16(7), 4426-4436 (2008).

Thompson et al., "Imaging in Scattering Media by Use of Laser Speckle," J. Opt. Soc. Am. A 14, 2269-2277 (1997) (9 Pages).

Towghi, N. et al., Fully phase encryption image processor, J. Opt. Soc. Am. A 16, 1999, pp. 1915-1927.

Traver et al. Paper entitled "Human Gesture Recognition Using Three Dimensional Integral Imaging" J. Opt. Soc Am. A 31(10):2312-2320 (2014). [9 pages].

Viola, M. Jones, and D. Snow, "Detecting pedestrians using patterns of motion and appearance," Int. J. Comput. Vis. 63(2), 153-161 (2005).

Wu et al. "Hiding Scattering Layers For Noninvasive Imaging of Hidden Objects," Scientific Reports vol. 5, 8375 (2015) (5 Pages).

Yamaguchi and R. Higashida, "3D touchable holographic light-field display," Appl. Opt. 55(3), A178-A183 (2016).

Yoo, et al., "Imaging Through A Scattering Wall Using Absorption," Opt. Lett. 16, 1068-1070 (1991) (3 Pages).

Zhao et al., "A novel three-dimensional object detection with the modified You Only Look Once method," International Journal of Advanced Robotic Systems, Mar.-Apr. 2018: 1-13.

* cited by examiner

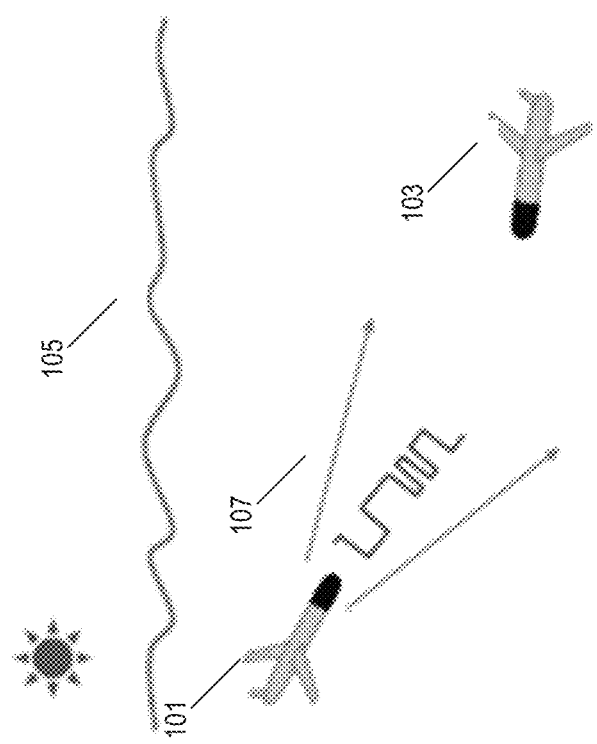
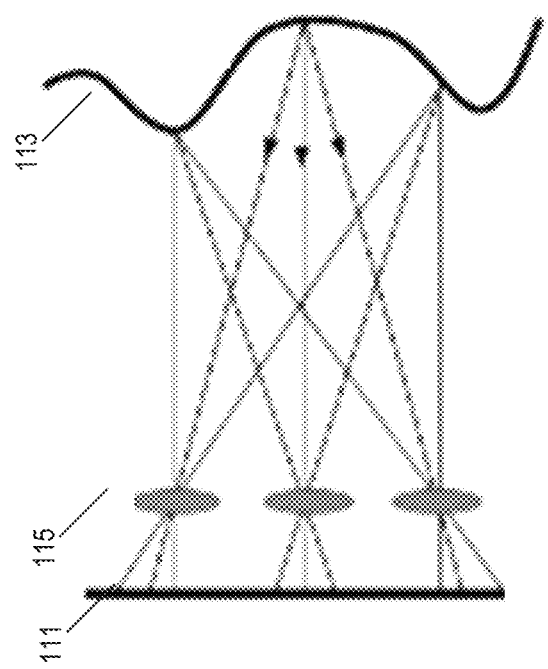
FIG. 1A
FIG. 1B

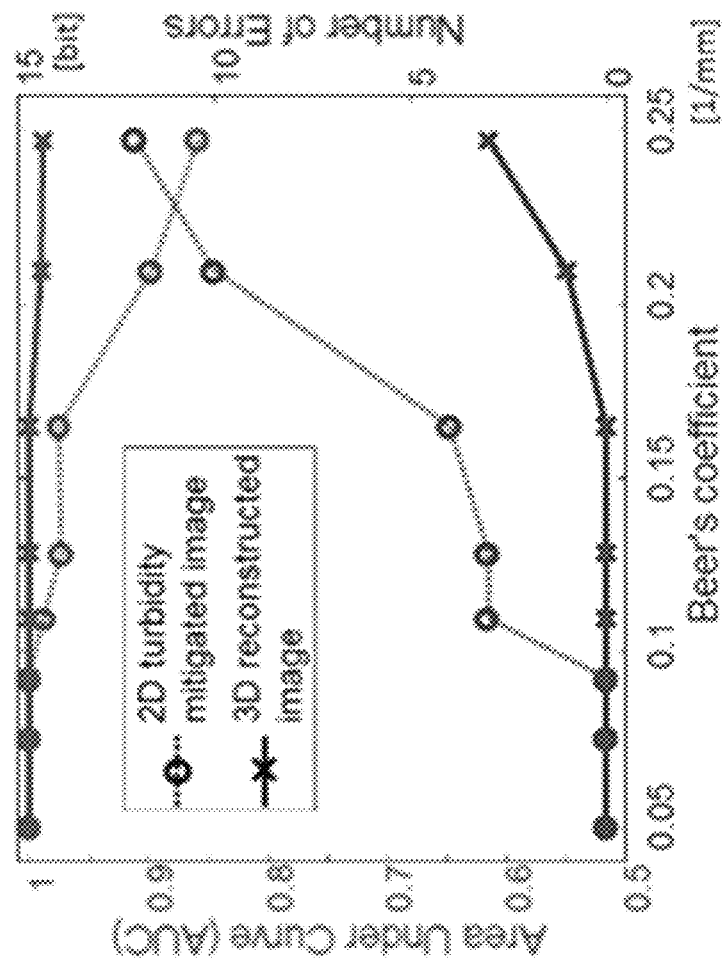
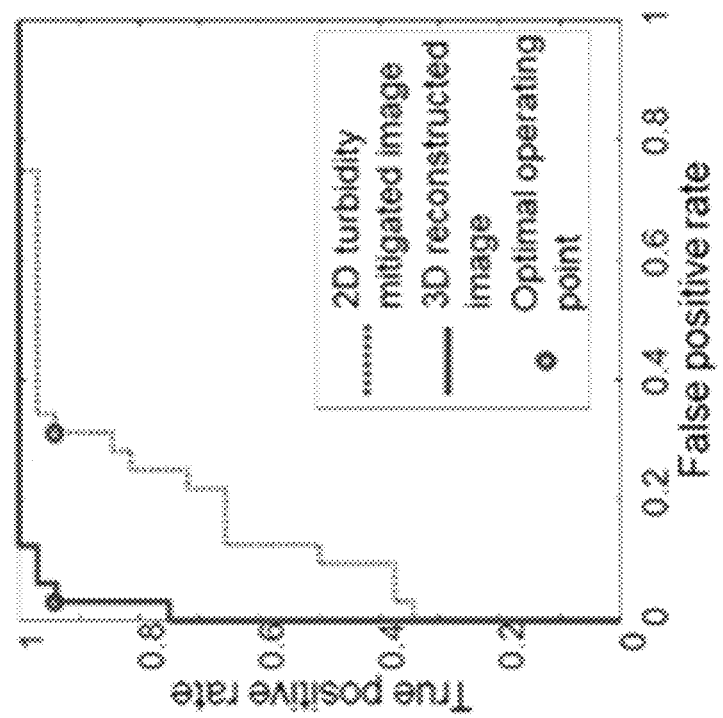
*FIG. 6A*
*FIG. 6B*

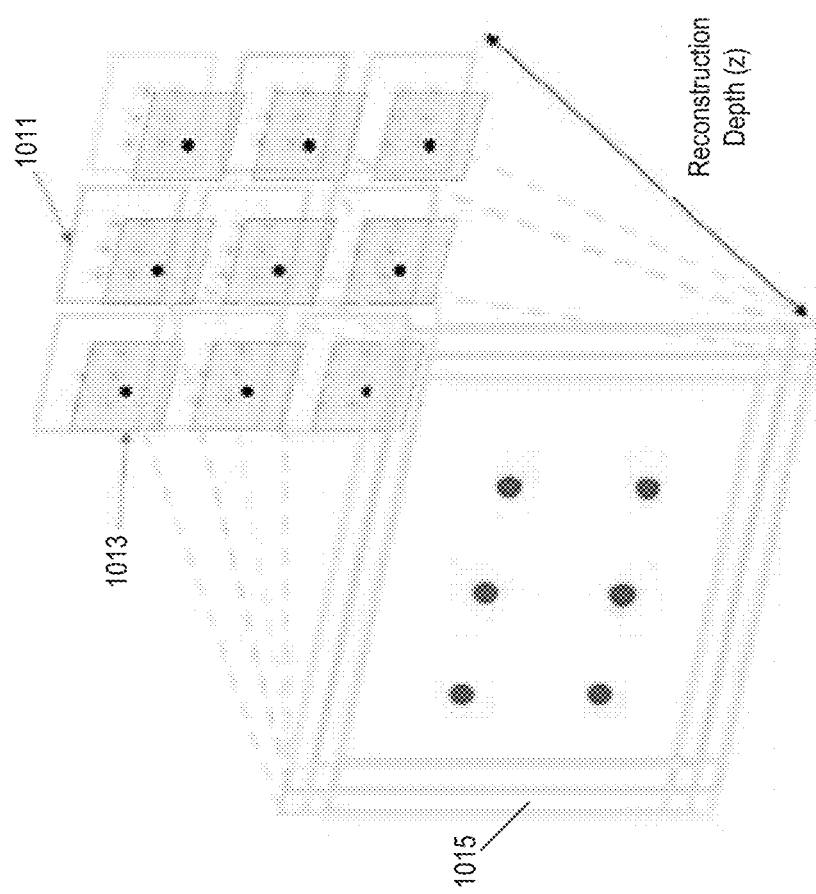
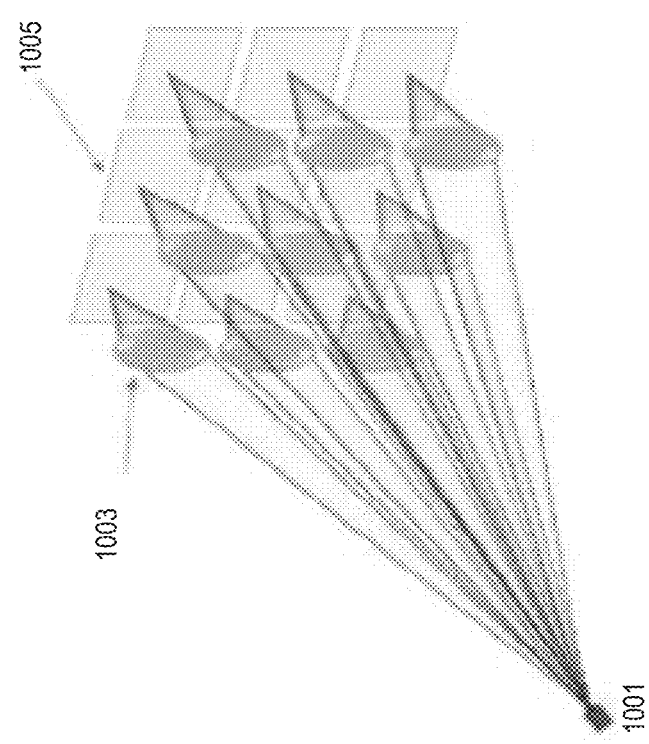
FIG. 10B
FIG. 10A

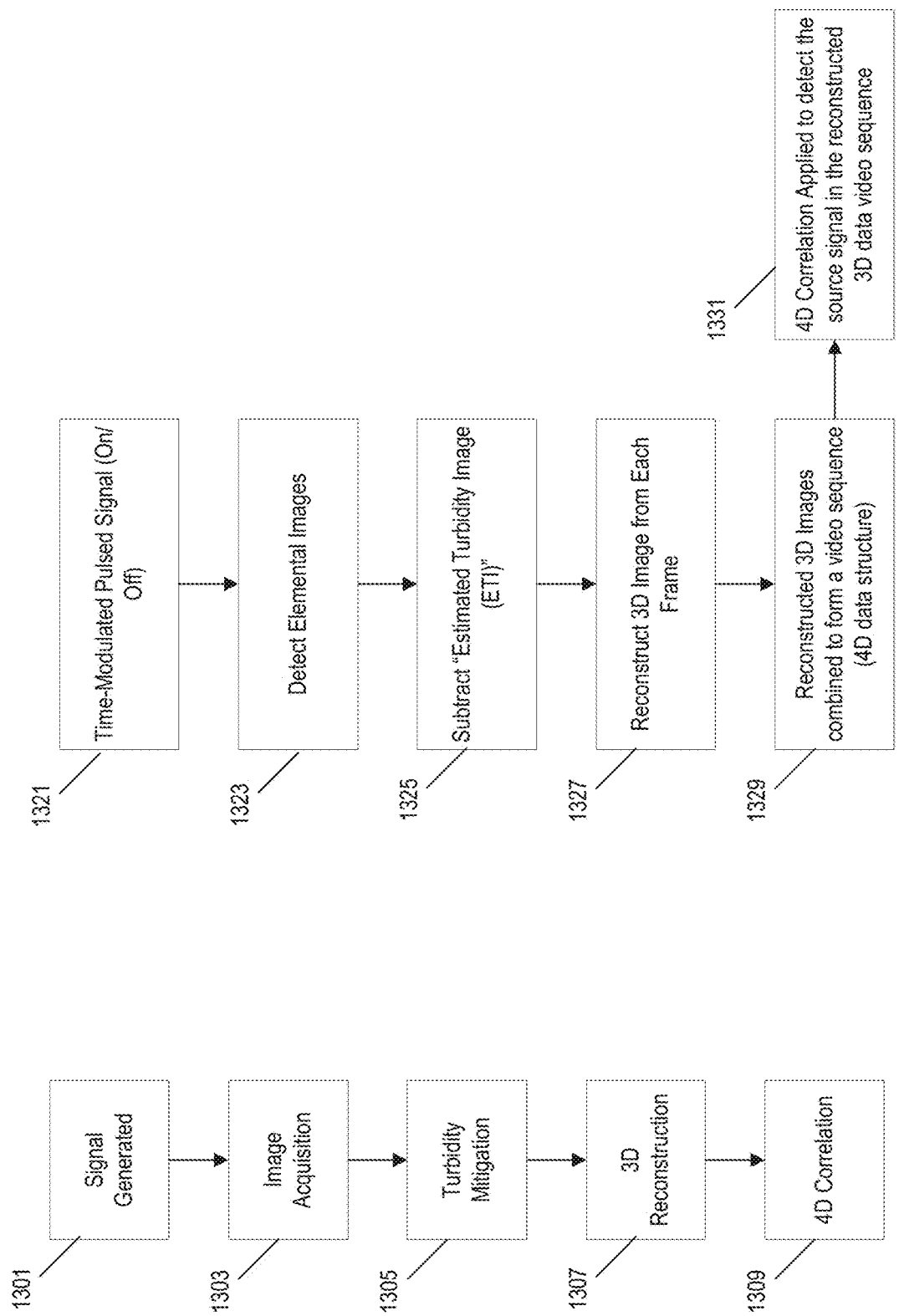

SYSTEM AND METHOD FOR OPTICAL SENSING, VISUALIZATION, AND DETECTION IN TURBID WATER USING MULTI-DIMENSIONAL INTEGRAL IMAGING

RELATED APPLICATIONS

This Application claims the benefit of U.S. Provisional Patent Application No. 62/855,248, filed May 31, 2019, entitled "SYSTEM AND METHOD FOR OPTICAL SENSING, VISUALIZATION AND DETECTION IN TURBID WATER USING MULTI-DIMENSIONAL INTEGRAL IMAGING," the entire contents of which are incorporated herein by reference.

STATEMENT REGARDING FEDERALLY SPONSORED RESEARCH OR DEVELOPMENT

This invention was made with government support under Grant number N00014-17-1-2405 awarded by the Office of Naval Research. The government has certain rights in the invention.

BACKGROUND

The present disclosure relates generally to systems and methods for optical sensing, visualization, and detection in media (e.g., turbid media; turbid water; fog; non-turbid media) and, more particularly, to systems and methods for optical sensing, visualization and detection in turbid media. Some examples of underwater optical communication systems are described in U.S. Patent Publication Nos. 2015/0372769, 2014/0212142, 2007/0183782, and 2008/0205892, the entire contents of which are incorporated herein by reference.

SUMMARY

The present disclosure provides improved systems and methods for optical sensing, visualization, and detection in media (e.g., turbid media; turbid water; fog; non-turbid media). More particularly, the present disclosure provides advantageous systems and methods for optical sensing, visualization and detection in turbid media using multi-dimensional integral imaging. In some embodiments, the systems and methods described herein provide and utilize underwater optical communication and signal detection systems based on multi-dimensional integral imaging with spatially distributed light sources and four-dimensional (4D) spatial-temporal signal detection and classification.

Other aspects of the invention will become apparent by consideration of the detailed description and accompanying drawings.

BRIEF DESCRIPTION OF THE DRAWINGS

FIG. 1A is an elevation view of an example of underwater sensing including underwater vehicles (e.g., autonomous underwater vehicles ("AUV")) communicating with each other.

FIG. 1B is a schematic diagram illustrating an operational example of integral imaging.

FIG. 6A is a graph of an "ROC" curve (i.e., a "receiver operating characteristic" curve) for 2D turbidity mitigation and 3D reconstruction in turbid water with a Beer's coefficient of $\alpha=0.247$.

FIG. 6B is a graph of an "area under curve" (AUC) and a number of detection errors in a received sequence relative to the Beer's coefficient of the water turbidity.

FIG. 10A is a schematic illustration of a mechanism for acquiring elemental images in the system of FIG. 7.

FIG. 10B is a schematic illustration of a mechanism for computational 3D reconstruction based on the elemental images captured by the process of FIG. 10A.

FIG. 13A is a flowchart of a method for optical signal detection using 3D reconstruction and 4D correlation.

FIG. 13B is a flowchart of a specific example for implementing the method of FIG. 13A.

DETAILED DESCRIPTION

Figure 1C:
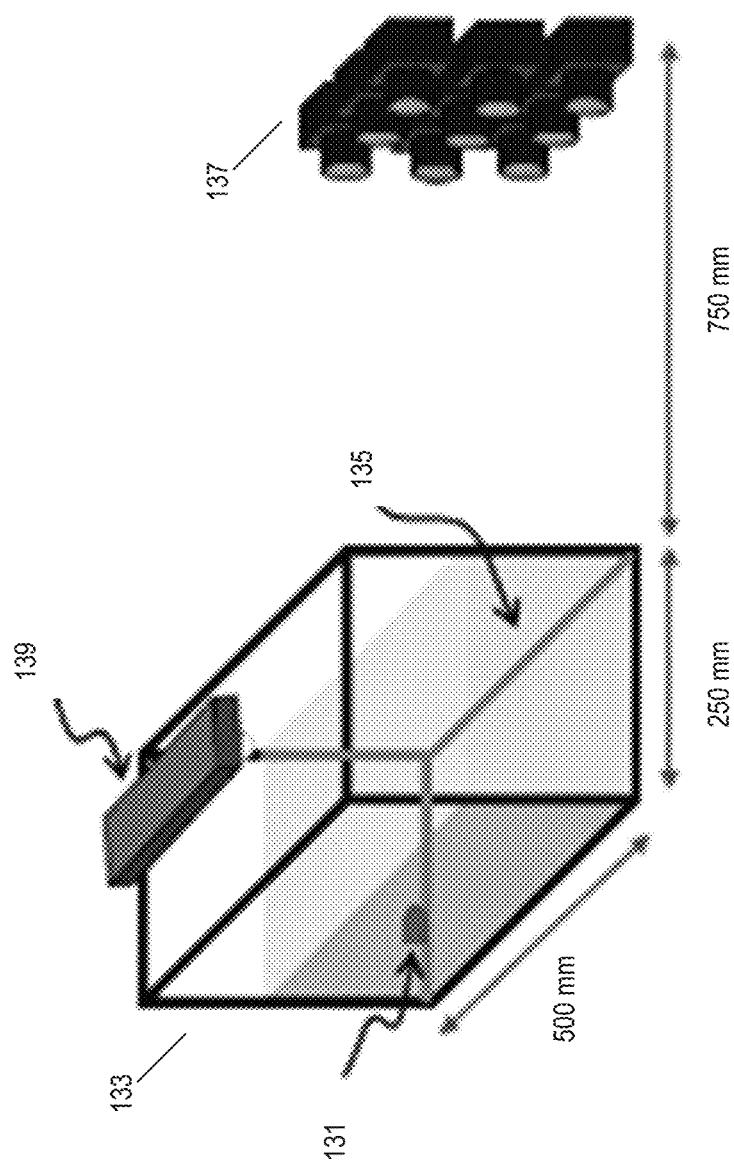
FIG. 1C is a perspective view of an integral imaging system configured to capture video sequences of optical signals sent by a light source (e.g., a blue light-emitting diode ("LED")).

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The exemplary embodiments disclosed herein are illustrative of advantageous methods for optical sensing, visualization and detection in media (e.g., turbid media; turbid water; fog; non-turbid media), and systems of the present disclosure and assemblies or techniques thereof. It should be understood, however, that the disclosed embodiments are merely exemplary of the present disclosure, which may be embodied in various forms. Therefore, details disclosed herein with reference to exemplary assemblies and sensing/detection methods and associated processes/techniques of assembly and use are not to be interpreted as limiting, but merely as the basis for teaching one skilled in the art how to make and use the advantageous methods for optical sensing, visualization and detection in turbid media and/or alternative systems of the present disclosure.

The present disclosure provides improved systems and methods for optical sensing, visualization and detection in media (e.g., turbid media; turbid water; fog; non-turbid media). More particularly, the present disclosure provides advantageous systems and methods 5 for optical sensing, visualization and detection in turbid media using multi-dimensional integral imaging.

In exemplary embodiments, the present disclosure presents an approach for optical sensing, visualization and detection in turbid water using multi-dimensional spatial-temporal domains integral imaging and dedicated signal processing algorithms. An optical signal is encoded using pseudorandom sequences and an image sensor array (e.g., a one dimensional array of cameras; a randomly distributed array of cameras; the image sensor array including multiple spectral band sensors) is used to capture elemental image video sequences of light propagating through turbid water. Using the captured information, multidimensional image reconstruction followed by multi-dimensional correlation to detect the source signal is performed.

Scenarios are experimentally demonstrated in which turbidity causes conventional signal detection to fail, while the proposed multi-dimensional approach enables successful detection under the same turbidity conditions. Statistical analysis is provided to support the experimental results. This is the first report of using multi-dimensional integral imaging signal detection in turbid water conditions.

An optical transmitter system is used to send optical signals coded by pseudo random sequences using a light source (e.g., a single wavelength light source; a multiple wavelengths light source). The receiver system is used to acquire multiple perspective two-dimensional (2D) video sequences using an image sensor array. A three-dimensional (3D) image is reconstructed from each frame. The 3D reconstructed image is an image reconstructed for a particular depth plane resulting in only objects lying in this plane to appear in focus. Objects not located on this plane appear out of focus. The 3D reconstructed images are then combined to form a video sequence, e.g., a four-dimensional (4D) data volume containing spatial and time domains. The detection system is used to detect the transmitted optical signals from the 3D video sequence by applying a 4D correlation filter. It is demonstrated that a robust optical signal detection system based on multi-dimensional integral imaging can be used for accurate optical signal detection.

Some potential users of the exemplary systems/methods of the present disclosure include: marine exploration, autonomous or unmanned underwater vehicles (AUV/UUV), improved underwater optical communication when other methods (e.g. sonar) are not effective, improved underwater sensing, free space optical communication in turbid media, including fog.

Current practice provides that a single time domain sensor system is used for underwater optical signal detection; however, signal-to-noise ratio (SNR) is low and the effective transmission distance is short in turbid water.

This advantageous systems/methods of the present disclosure are important because they provide a high signal-to-noise ratio (SNR) and high accuracy optical signal detection system for underwater applications in turbid water. The system may be installed on an AUV/UUV or other underwater applications.

Moreover, the multidimensional system can increase the effective signal detection distance compared with the conventional single sensor system due to the increased SNR. In addition, the conventional single optical sensor system cannot detect the optical signals when an object occludes the transmitter from the direct line of path of the sensor, however, this sensing system of the present disclosure can detect the signals even in the presence of occlusion due to the multiple perspectives captured by the multidimensional sensor.

In this disclosure, a novel multi-dimensional spatial and temporal domains integral imaging for underwater signal detection in turbid water is proposed and demonstrated. A pseudorandom sequence (PRS) is transmitted using a LED light source. This information is captured using a camera array with CMOS sensors, where the resulting video sequences consist of elemental images. The turbidity is mitigated on the elemental images using statistical signal processing, followed by 3D computational reconstruction, which improves the optical signal quality and reduces noise according to maximum likelihood estimation. Multi-dimensional (x, y, z, t) correlation is applied to detect the source signal in the reconstructed 3D data using the video sequence. Experiments demonstrate that conventional signal detection may fail under turbid water environments, whereas the proposed multidimensional approach may be able to successfully detect the signal.

The present disclosure provides an approach for optically-based signal detection in turbid water/underwater applications. As discussed further below, FIGS. 1A-1C and FIGS. 13A-13B depict some exemplary approaches and steps of the systems and methods of the present disclosure.

Some potential commercial opportunities include underwater applications such as marine exploration, underwater vehicles, additional methods when alternatives (such as sonar) are ineffective, and also free space optical communication in turbid media (including fog).

Some advantages of the disclosed systems/methods of the present disclosure include, without limitation: enables determination of source location (and distance to source), provides depth information; improved signal-to-noise ratio, increased signal detection distance, improved signal quality; direct line of sight may not be required.

The present disclosure will be further described with respect to the following examples; however, the scope of the disclosure is not limited thereby. The following examples illustrate the advantageous systems, methods and assemblies for optical sensing and detection in turbid media (e.g., turbid water; fog) of the present disclosure.

EXAMPLE 1

Optical Sensing and Detection in Turbid Water Using Multi-Dimensional Integral Imaging This Example presents an approach for optical sensing and detection in turbid water using multidimensional spatial-temporal domain integral imaging and dedicated signal processing algorithms. An optical signal was encoded using pseudorandom sequences, and an image sensor array was used to capture elemental image video sequences of light propagating through turbid water. Using the captured information, multidimensional image reconstruction followed by multidimensional correlation to detect the source signal was performed. Scenarios were experimentally demonstrated in which turbidity caused a conventional signal detection to fail, while the proposed multidimensional approach enabled successful detection under the same turbidity conditions. Statistical analysis was provided to support the experimental results. This is the first report of using multidimensional integral imaging signal detection in turbid water conditions.

In general, there is a great deal of interest and research in using information optics and related technologies for underwater applications. Optical technologies provide large bandwidth and parallelism that can make information optics attractive. Applications can include optical sensing and detection, such as autonomous or unmanned underwater vehicles (AUVs/UUVs) for marine exploration. FIG. 1A illustrates an example in which a pair of AUVs 101, 103 are operating below a sea surface 105 at a relatively shallow depth. The first AUV 101 emits a light-based communication signal 107 towards the second AUV 103. However, light generally cannot propagate as far as sonar due to absorption and scattering in the underwater medium.

Using a turbidity mitigation technique known as peplography, the effect of turbidity may be reduced, allowing for better capture of ballistic rays. Moreover, methods for sensing in turbulence have been reported. Integral imaging is a 3D technique that uses a single camera with a lenslet array, a camera array, or a camera on a moving platform to capture different perspectives of a scene known as elemental images (EIs). Using EIs, 3D reconstructed images of the scene are computed providing depth information, occlusion removal, etc.

3D integral imaging reconstruction can reduce the noise in a scene due to the reconstruction algorithms being naturally optimum in maximum likelihood sense when additive Gaussian noise is present. De-scattering methods in turbid media have been mainly applied to improve object visualization.

In this Example, systems/methods for a novel multidimensional spatial and temporal domain integral imaging for underwater signal detection in turbid water is proposed and demonstrated. A pseudorandom sequence (PRS) is transmitted using a LED light source. This information is captured using a camera array with CMOS sensors, where the resulting video sequences consist of EIs. The turbidity is mitigated on the EIs using statistical signal processing, followed by 3D computational reconstruction, which improves the optical signal quality and reduces noise according to maximum likelihood estimation (MLE).

Multidimensional (x, y, z, t) correlation is applied to detect the source signal in the reconstructed 3D data using the video sequence. One can demonstrate by experiments that conventional signal detection may fail under turbid water environments, whereas the proposed multidimensional approach may be able to successfully detect the signal. Information theoretic and statistical performance metrics, including Kullback-Leibler divergence and probabilities of classification errors, are measured and compared for various Beer-Lambert law turbidity conditions to demonstrate the improved performance of the proposed approach.

FIG. 1B illustrates an integral imaging sensing and detection system in which an image sensory array 111 captures image data of a 3D object or scene 113 through a lens array 115. FIG. 1C presents the experimental setup in which the integral imaging system of FIG. 1B is used to capture optical image data indicative of an optical communication signal. A light source 131 (e.g., a blue LED) is positioned on a side of a water tank 133 and operated to transmit an optical signal through turbid water 135 in the tank 133 by controllable pulses (i.e., On/Off). A image sensor array 137 is positioned outside of the tank 133 opposite the light source 131. An external white LED light source 139 is positioned to provide ambient light conditions. In the experiments, a time modulated light signal was generated using the blue LED (light source 131). In this specific example, the light source 131 and the image sensor array 137 are both positioned external to the turbid water medium 135 on opposite sides of the tank 133. However, in other implementations, one of the light source 131 or the image sensor array 137 may be positioned within the turbid water 135 while the other is positioned outside of the water. In still other implementations, both the light source 131 and the image sensor array 137 are positioned within the turbid water 135 (e.g., as in the example of FIG. 1A).

The signals were coded by a PRS for robust temporal detection as is the case for a spread spectrum or code division multiple access. A PRS with length N generates high auto-correlation peaks and low cross-correlation when authenticated using a matched filter. The temporal signal used in the experiments was a 960-bit length sequence which is 64-bit data coded by a 15-bit PRS generated by linear feedback shift register and transmitted at a speed of 20 bits per second. The 64-bit data contains a 32-bit one and 32-bit zero values. The generated 15-bit PRS is transmitted when the data are 1, whereas, when the data are 0, an inverted 15-bit PRS is transmitted.

For signal detection, EIs of a scene containing an optical signal transmitted in turbid water are captured using a camera array. The turbidity causes scattering of light from undissolved materials for both the light source and ambient light, such as sunlight in shallow waters.

After image acquisition, the scattered ambient light in each EI is computationally mitigated by subtracting an estimated turbidity image. The estimated turbidity image is obtained from imaging the scene with the LED source off before transmitting the signals followed by applying the estimation process.

The turbidity estimation method assumes a scattering media is modeled by a Gaussian distribution with a mean value $\mu_p^{ij}$ and a variance $(\sigma_p^{ij})^2$, where i and j are the indices of each scattering medium position (e.g., each pixel position in the captured image). The unknown parameter $\mu_p^{ij}$ is estimated using MLE. The estimated mean value $\hat{\mu}_p^{ij}$ is computed by finding the mean value of the pixels within a windowed area using the equation:

$$\hat{\mu}_p^{ij} = \underset{\mu_p^{ij}}{\operatorname{argmax}}\{l[X^{ij}(a,b) \mid \mu_p^{ij}, (\sigma_p^{ij})^2]\} = \frac{1}{w_x w_y} \sum_{a=1}^{w_x} \sum_{b=1}^{w_y} h_{ij}(a,b) \quad (1)$$

where l is a log-likelihood function of Gaussian distribution, $X^{ij}(a, b)$ are the random variables located at i,j, wx, wy is the size of the window, and $h_{ij}$ is a cropped window area located at i,j. The estimated image due to turbidity is formed by a raster scan of the whole image using $\hat{\mu}_p^{ij}$ at each window location.

To improve the signal-to-noise ratio (SNR) of the turbidity-mitigated images ($EI_{filtS}$), computational 3D reconstruction using integral imaging is applied which has the added benefit that the 3D reconstructed images are optimum in the MLE sense, assuming additive Gaussian noise. Moreover, integral imaging uses multiple images with different perspectives of the scene allowing for an increased number of ballistic rays to be captured from the scene. The computational reconstruction images using synthetic aperture integral imaging are generated using the back projection process of the $EI_{filtS}$.

The pinhole model is assumed during the reconstruction, and the rays are backpropagated through their corresponding virtual pinholes. The reconstructed image is focused on a particular plane, where objects on the plane are in focus, while out-of-plane objects appear out of focus. The 3D reconstructed image, $I_r(x, y, z)$, is $$I_r(x, y, z) = \frac{1}{O(x, y)} \sum_{m=0}^{M-1} \sum_{n=0}^{N-1} \times \left( EI_{filt}^{m,n}\left(x - \frac{mN_x P_x f}{C_x z}, y - \frac{nN_y P_y f}{C_y z}\right) \right) \quad (2)$$

where (x, y) is the pixel index, O(x, y) is the image overlapping number on (x, y), M and N are the total number of $EI_{filtS}$ in the mth column and the nth row, $EI_{filt}^{m,n}$ is the mth column and the nth row $EI_{filtS}$, $N_x$ and $N_y$ are the total number of pixels in each column and row on images, $P_x$ and $P_y$ are the pitch between image sensors, $C_x$ and $C_y$ are the sizes of the image sensor, $f$ is the focal length, and z is the reconstruction distance, which is denoted by $z=z_{air}+z_w/n_w$, where $z_{air}$ is the distance between the camera and the water tank surface, $z_w$ is the distance between the water tank surface and the LED, and $n_w$ is the refraction index of water.

The signal detection experiments in turbid water, as shown in FIG. 1C, were carried out under different concentrations of turbid water. The water tank dimensions were 500(W)×250(L)×250(H) mm. A camera array consisting of nine Allied Vision Mako G-192 GigE cameras with Ricoh 12.5-75 mm F1.8 lenses, each having a pixel size of 4.5 μm square and resolution of 1600(H)×1200(V) pixels, was used. The focal length was set to 20 mm. For the integral imaging setup, a 3×3 camera array was used with a camera pitch of 80 mm for both horizontal and vertical directions. The exposure time was set to 10 ms, and the frame rate was 20 fps. In this experiment, a 3×3 camera array was used, however, smaller or larger camera arrays, a one dimensional distributed camera array, or a randomly distributed camera array may be used.

The camera array was located 750 mm away from the surface of the water tank. A blue LED was used as the light source for the communication transmitter and was located just behind the water tank. The power was 1.05 mW, and the dominant wavelength was 467 nm. It is noted that the dominant wavelength of the light source can be adapted for optimum penetration through turbid media/water or the like.

Additionally, a desk lamp with a white LED array was set on top of the water tank as an ambient light source to mimic a shallow water scene. Eight different concentrations of turbid water scenes were made by mixing 25 liters of pure water with 25-200 ml of liquid antacid.

To quantify the attenuation of light as it propagates through the medium, the Beer-Lambert law, $I=I0 \exp(-\alpha d)$, was used, where I0 is a reference intensity, I is the intensity after propagating a distance d, and α denotes the amount of absorbance.

Figure 2A:
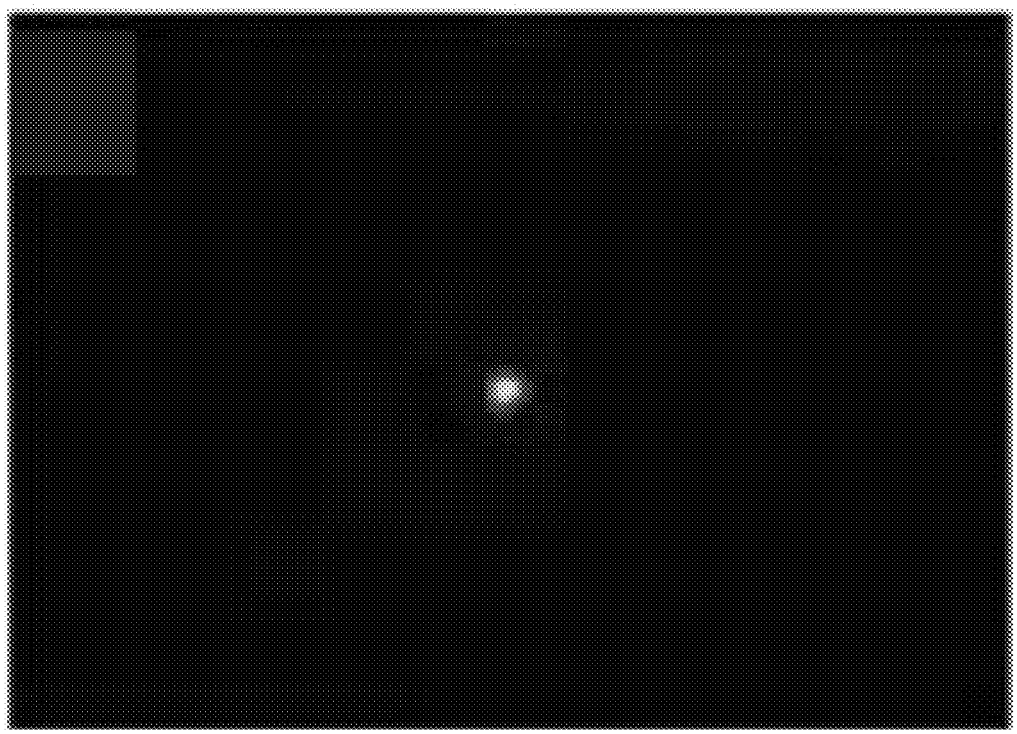
FIG. 2A shows an example of an elemental image of the LED light source in the system of FIG. 1C in clear water conditions.
Figure 2B:
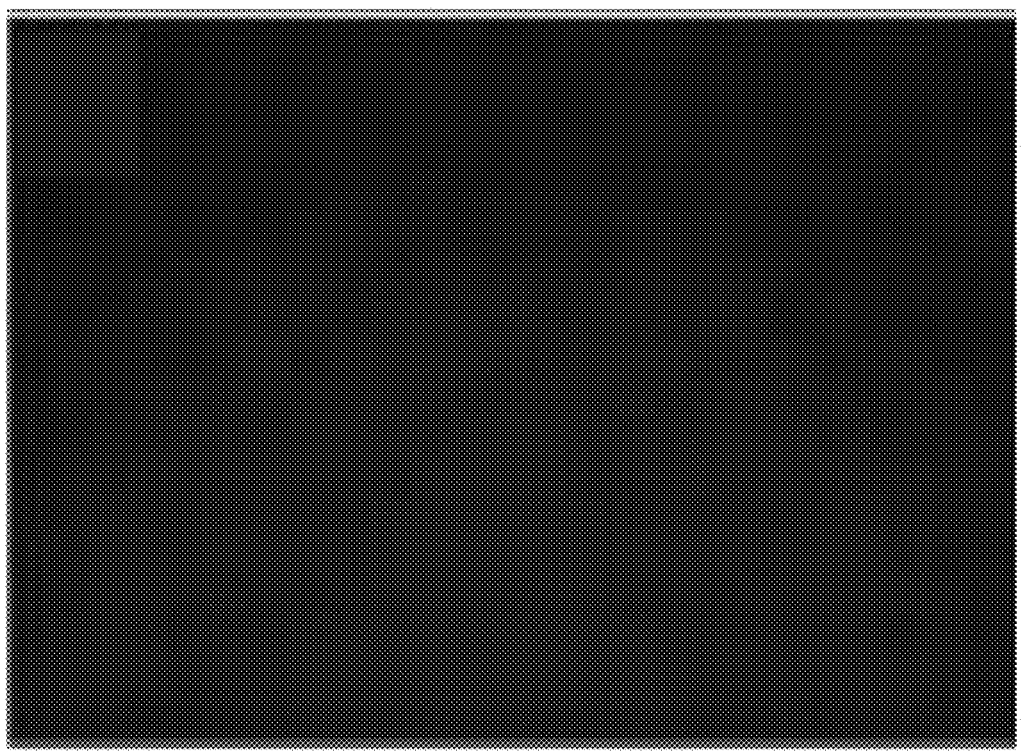
FIG. 2B shows an example of an elemental image of the LED light source in the system of FIG. 1C in turbid water (i.e., Beer-Lambert law turbidity coefficieint $\alpha=0.050$).

For the aforementioned experiment, α was varied between 0.050 and 0.247. Sample EIs of the LED in clear water are shown in FIG. 2A and in turbid water in FIG. 2B, in which the concentration is α=0.050. In the turbid water conditions, the light from the LED source and the ambient light are scattered by the antacid particles.

Figure 3A:
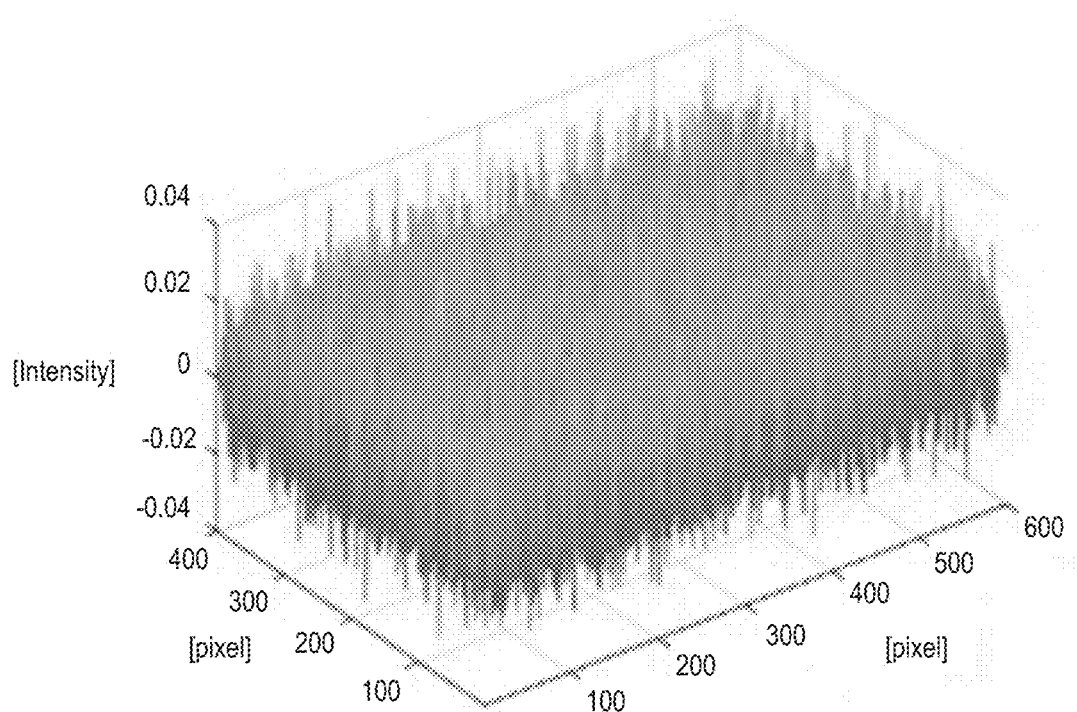
FIG. 3A is a graph of blue-channel light intensity of the 2D elemental image of FIG. 2B after turbidity mitigation.

A 3D plot of the blue channel intensity of the turbidity-mitigated EI using the estimation approach described earlier is shown in FIG. 3A, when the Beer's coefficient is α=0.050.

Figure 3B:
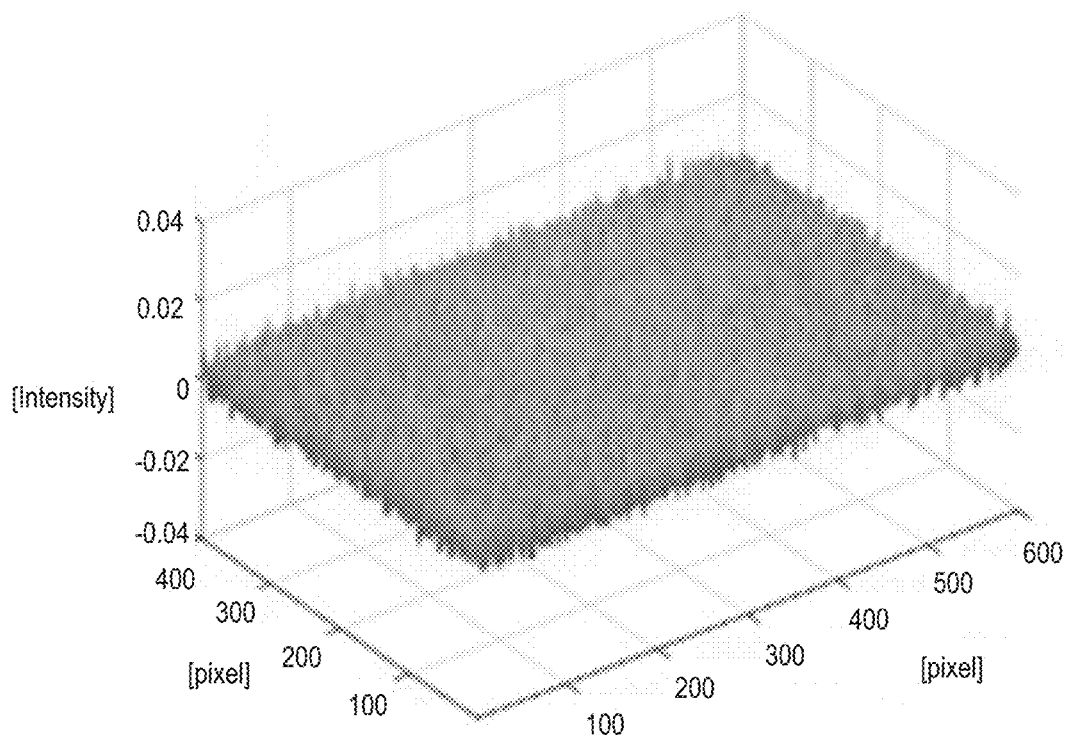
FIG. 3B is a graph of blue-channel light intensity of a 3D reconstructed image of the LED source in the system of FIG. 1C using nine turbidity-mitigated elemental images.

It is difficult to know the LED source position because noise is present throughout the whole image. The 3D integral imaging reconstruction was applied after the turbidity mitigation process. The 3D plot of blue channel intensity of the 3D reconstructed images focused on the LED plane is shown in FIG. 3B. The noise in the 3D reconstructed image is reduced in FIG. 3B, compared to the 2D EI shown in FIG. 3A.

In the low turbidity conditions, which has a Beer's coefficient of α=0.050 in an exemplary experiment, one can observe the location of the light source from the relatively high intensity area of the 3D reconstructed image, as shown in FIG. 3B.

When the high intensities are localized, one can expect this area to represent the location of the light source. Under low turbidity conditions, there are many ballistic rays from the light source. In more turbid conditions, the LED signal is more scattered, which makes it difficult to determine the location of the light source visually due to the low number of ballistic rays. However, it is still possible to determine whether the LED signal is on or off by analyzing the 3D reconstructed image.

To evaluate the signal detection performance, statistical parameters of the 2D turbidity-mitigated image and the 3D reconstructed image were measured. The mean $\mu_{sig}$ and standard deviation $\sigma_{sig}$ for the signal were evaluated at a Beer's turbidity coefficient of α=0.050.

The signal is the image captured when the LED source is turned on. To calculate these statistical properties, the captured image of the LED source area, which was 10×10 pixels, was cropped.

Standard deviation values of the signal using the 2D turbidity-mitigated image are 0.0067. The 3D reconstructed image reduces the standard deviation to 0.0023. The statistical measurements in the experiments indicate that the standard deviation of the 3D reconstructed image is 2.9 times smaller than that of the 2D turbidity-mitigated image. Furthermore, the SNR for signal detection is calculated using $SNR=\mu_{sig}/\sigma_{sig}$.

The SNRs of the 2D turbidity-mitigated image and 3D reconstructed image are 0.483 and 1.347, respectively. The SNR using the 3D reconstructed image is 2.8 times higher than the SNR using the 2D turbidity-mitigated image.

The probability density function for light intensity through randomly homogeneous media is the modified Rice distribution which may be considered here, given some assumptions:

$$p_I(I) = \frac{1}{2\sigma^2} \exp\left(-\frac{I+A^2}{2\sigma^2}\right) I_0\left(\frac{\sqrt{I}A}{\sigma^2}\right), I \geq 0 \quad (3)$$

where I is the intensity of the image, A and σ are the parameters of the modified Rice distribution, and $I_0$ is a modified Bessel function of the first kind, zero order.

The parameter from the 2D EI using MLE was estimated; then A and σ are 0.0265 and 0.0061, respectively.

The distribution of the 3D reconstructed data can be a sum of Rice distributions. This distribution is approximately a Gaussian distribution. To verify the distribution of the 3D reconstructed data, a Kolmogorov-Smirnov test was applied to the data cropping the overlapping area of the nine camera images which was a 400×600 pixel area as a region of interest (ROI), and the result was that the test accepted the null hypothesis.

The intensity distribution of the 3D reconstructed data is regarded as Gaussian distribution. To analyze the distance between the two distributions for the LED signal turned off and on (in the presence of an external light source), the Kullback-Leibler divergence measures the amount of difference between two probability distributions:

$$D_{KL}(R\|Q) = -\sum_{k} R(k) \log \frac{Q(k)}{R(k)} \quad (4)$$

where R and Q are the discrete probability distributions of a random event k.

The probability distributions of the LED turned off and on to R and Q were set, respectively. The $D_{KL}$ of the turbidity-mitigated image was 0.0223, and the $D_{KL}$ of the 3D reconstruction image was 0.3614.

These results show that the distributions of the LED turned off and on signals using the 3D reconstruction have a larger class separation than that of the 2D turbidity-mitigated signals. Thus, the 3D reconstructed signal is able to achieve better classification between the LED turned off and on signals.

Figure 4A:
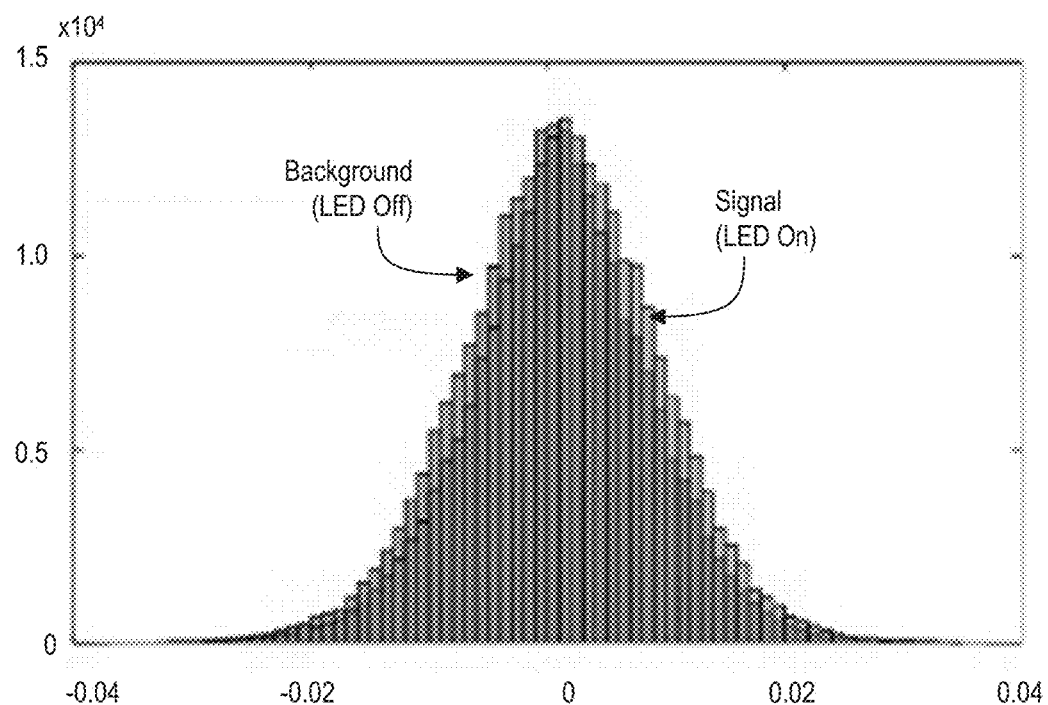
FIG. 4A is a histogram of the turbidity-mitigated 2D elemental image of FIG. 3A.
Figure 4B:
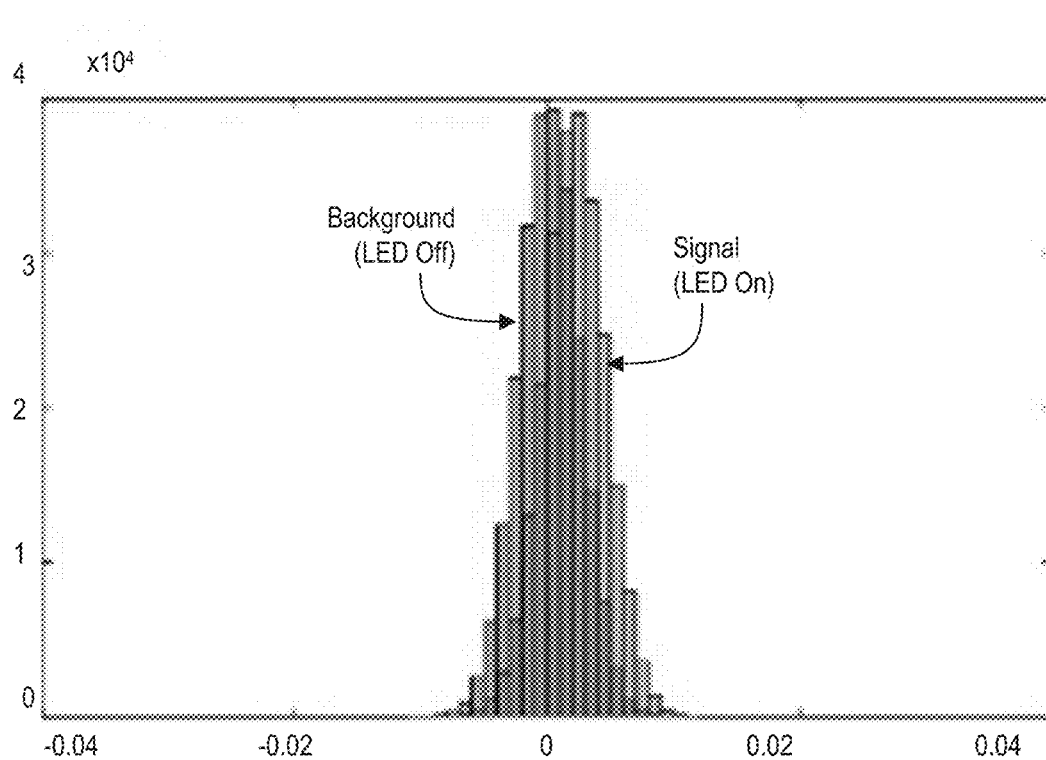
FIG. 4B is a histogram of the 3D reconstructed data of FIG. 3B.

Histograms of the image intensity of the 2D turbidity-mitigated data and the 3D reconstruction data at the ROI are shown in FIGS. 4A and 4B, respectively. The blue and orange bins depict the cases in which the LED is turned off (background) and on (signal), respectively.

After the 3D reconstruction, 4D correlation was applied in the (x, y, z, t) domain, which is 3D spatial plus temporal domain, to detect the transmitted 64-bit data coded by the 15-bit PRS.

One can assume that noise on the signal image is additive Gaussian white noise after the turbidity mitigation and the signal contains ballistic rays and scattered rays.

A 4D stack of images in (x, y, z, t) is numerically simulated to generate template $V_r$, where frames with the LED turned on contain a simulated Gaussian shape that mimics the shape of the transmitted light source.

A Gaussian light distribution with $\sigma_G=30$ pixels was used to model the light source intensity distribution. A test 4D image $V_t$ (x, y, z, t) is recorded experimentally by generating a 3D reconstruction volume in (x, y, z) which can contain reconstructed images at different depth z at each frame t.

Figure 5:
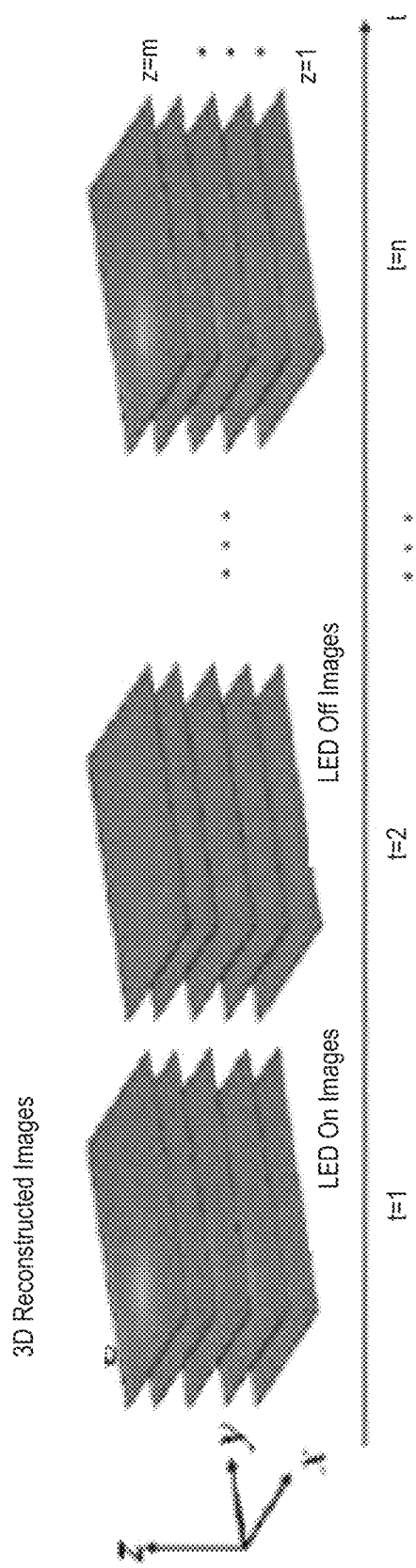
FIG. 5 is a schematic illustration of a four-dimensional (4D) data structure (x, y, z, t) for some implementations of a signal detection process.

FIG. 5 shows the 4D data structure. For signal detection, the template 4D volume image $V_r$ is correlated with the reconstructed 4D volume $V_t$ of the scene using a 4D matched filter.

In exemplary experiments, eight different depth images were 3D reconstructed at each frame. The temporal domain had 15 frames which was the same length as the PRS.

Thus, 4D correlation was applied to every 15 frames. When transmitted data are one, the 15 bit PRS is transmitted and a high peak value is detected in the 4D correlation. When transmitted data are 0, there is a low correlation value in the 4D correlation.

By using the PRS, accurate correlation values are maintained, and it is possible to communicate robustly, even if noise is present during the transmission. The high and low correlation values should appear in the center frame of the 15-frame sequence when the transmission is synchronized.

In the 3D correlation at the center frame $t_c$, the highest correlation value should appear at the light source position (x, y) and best reconstruction distance z. Therefore, maximum correlation values were extracted from the multidimensional (x, y, z; $t_c$) correlation signal, with 64-bit correlation values captured.

It was compared by experiments the signal detection performances between 2D sensing of PRS signals (x, y, t), and the proposed multidimensional (x, y, z, t) system using the integral imaging reconstruction of captured PRS signals. Turbidity mitigation was applied to 2D images in both cases. Receiver operating characteristic (ROC) curves were measured by comparing the detected correlation values for the transmitted 64-bit PRS data.

FIG. 6A shows the ROC curves in the high turbidity conditions with the Beer's coefficient of $\alpha=0.247$.

The ROC curve of the proposed multidimensional (x, y, z, t) system (solid line) shows higher classification performance than that of the 2D captured PRS images (dotted line). The area under the curve (AUC) is also calculated to analyze the performances. The AUC of the multidimensional (x, y, z, t) system and the (x, y, t) system are 0.988 and 0.858, respectively. Thus, the proposed system has an improved AUC and better classification performance.

Furthermore, the ROC curve was calculated in eight different turbidity conditions, and the AUC was evaluated to compare the two systems.

In FIG. 6B, the red lines based on the left vertical axis show the AUC versus the Beer's law coefficients. The AUC of the proposed multidimensional system (solid line) maintains higher values than those of the 2D turbidity-mitigated captured PRS image (dotted line) at all times under different turbidity ($\alpha$) conditions.

The number of detection errors was calculated for the transmitted 64-bit data in eight different turbidity conditions by using an optimal threshold. The optimal thresholds were calculated under each turbidity condition based on moving a straight line with slope, which was calculated by using false-positive cost, false-negative cost, and prevalence, from the upper left corner of the ROC curve.

In FIG. 6B, the blue lines based on the right vertical axis show the number of detection errors. The number of errors of the turbidity-mitigated 2D captured PRS image (dotted line) and the proposed multidimensional system (solid line) increases as the turbidity increases; however, the number of errors using the proposed approach is lower than that of the 2D sensing.

In summary, a novel signal detection approach under turbid water using multidimensional integral imaging to improve signal detection is presented.

It can be demonstrated that signal detection in heavy turbidity conditions may be possible using the temporal and spatial domain reconstructed data with integral imaging using turbidity-mitigated sensing. Multi-dimensional spatial-temporal domain (x, y, z, t) correlation was used to detect the signals encoded using a PRS. Future work can include using high-speed imaging, investigating various signal detection algorithms, and considering compressive sensing approaches to reduce data size.

EXAMPLE 2

Signal Detection using 3D Sensing with Active Polarization De-Scattering and Turbidity Mitigation in Scattering Media In turbid media, optical signals are attenuated by scattering which is caused by particles suspended in the media.

This makes optical signal detection and communication in turbid media a challenging task, and for this reason, there is a present need to increase the performance of optical signal detection. An approach for signal detection in scattering media using 3D sensing with active polarization descattering and turbidity mitigation using maximum likelihood estimation (MLE) is presented in this disclosure.

The optical signal is encoded using a pseudo-random sequence, and the image sensor array is used to capture an elemental image video sequence of light propagating through scattering media. After processing to remove the scattering and image reconstruction, 4D correlation is performed to detect the source signal. In this Example, a scenario is experimentally demonstrated in which turbidity causes an existing multidimensional signal detection to fail, where the proposed 3D sensing with active polarization descattering and turbidity mitigation approach enables successful detection under the same turbidity conditions.

There is much interest and research in using information optics and related technologies in underwater applications. Underwater optical communication is of interest because light has the characteristics of straightness and uniformity. However, light does not propagate in water as well as acoustic waves due to absorption and scattering in the underwater media.

In addition, in shallow water, noise is caused by external light, which causes problems in information transmission. To solve this problem, 3D sensing with active polarization descattering and turbidity mitigation using maximum likelihood estimation (MLE) is proposed. By using turbidity mitigation techniques, the effect of turbidity can be reduced. In addition, turbulence sensing methods have been reported.

Furthermore, this technology is used for visualization in scattering media and signal detection. Integral imaging (InIm) is a 3D sensing technique which works by capturing a variety of viewpoints of a scene known as an elemental images (EI). From the 2D elemental images, the perspective information contained in the scene is captured, and reconstruction of the 3D scene is possible by back-projection through a virtual pinhole or lenslet array. The InIm 3D reconstructed images provide depth information and occlusion removal. Furthermore, InIm also removes Gaussian noise as the process is optimal in the maximum likelihood sense. Active polarization descattering is one method for turbidity removal. Polarization has useful properties that enable applications such as visualization and object classification enhancement.

When unpolarized light is scattered by particles, it becomes polarized according to the corresponding scattering angle. On the other hand, multiple scattered light will not be polarized. Thus, when polarized light passes through turbid media, the properties of the polarization depend on the path. Based on this difference in polarization state, one can distinguish between scattered and unscattered light, and the scattering effect can be further reduced by removing the scattered components.

Using Active polarization descattering can be used to eliminate scatter caused by external light, and further turbidity mitigation using MLE can be used to make a signal clear. Turbidity mitigation using MLE is one statistical estimation method, and this method estimates which shape the light in the water will scatter to, and calculates the scatting media according to its estimate.

In this Example, a three-dimensional (3D) sensing approach based on InIm for turbidity removal using active polarization descattering and turbidity mitigation is presented. First, 3D sensing using a camera array captures a psuedo-random encoded optical signal. After capturing the elemental images, one can apply scattering removal by active polarization descattering in order to remove some of the scattered photons. Then, turbidity mitigation is applied using statistical scattering media estimation to further reduce the effect of scattering. Using the processed elemental images, integral imaging reconstruction is performed. Finally, one can compare the test data with a reference template for the signal using 4D correlation. Experiments were performed on a variety of turbidity conditions.

Integral Imaging: Integral imagin (InIm) is a technology for 3D sensing and reconstruction using multiple perspective 2D images. Each element image provides perspective information about the scene that can be used to extract orientation information. This technique has been widely applied to 3D sensing and display, object detection in degraded conditions, and human gesture recognition.

3D computational reconstruction also provides depth information about the object of interest and improves the signal-to-noise ratio. 3D reconstruction is following as:

$$R(x, y, z) = \frac{1}{m \times n} \Sigma_{i=1}^{m} \Sigma_{j=1}^{n} \left[ I_{i,j}\left(x + \frac{N_x \times p_c}{c_x \times r_z}, y + \frac{N_y \times p_c}{c_y \times r_z}\right) \right] \quad (5)$$

where m, n are the number of elemental images in the x and y directions, $I_{i,j}$ is the intensity of the elemental image in the $i^{th}$ column and $j^{th}$ row, $N_x$, $N_y$ are resolution for each elemental images in the x and y directions, $p_c$ is pitch between each image sensors. $c_x$, $c_y$ are image sensor size. $R_z = z/f$ is the magnification factor, and f is focal length of the camera.

In the reconstructed image, information from the reconstructed z-plane will appear in-focus whereas all information from different depths appear out-of-focus and blurred. Additionally, the 3D reconstruction process can be regarded as an averaging process which helps to improve the SNR of the reconstructed image in the presence of Gaussian noise.

Figure 7:
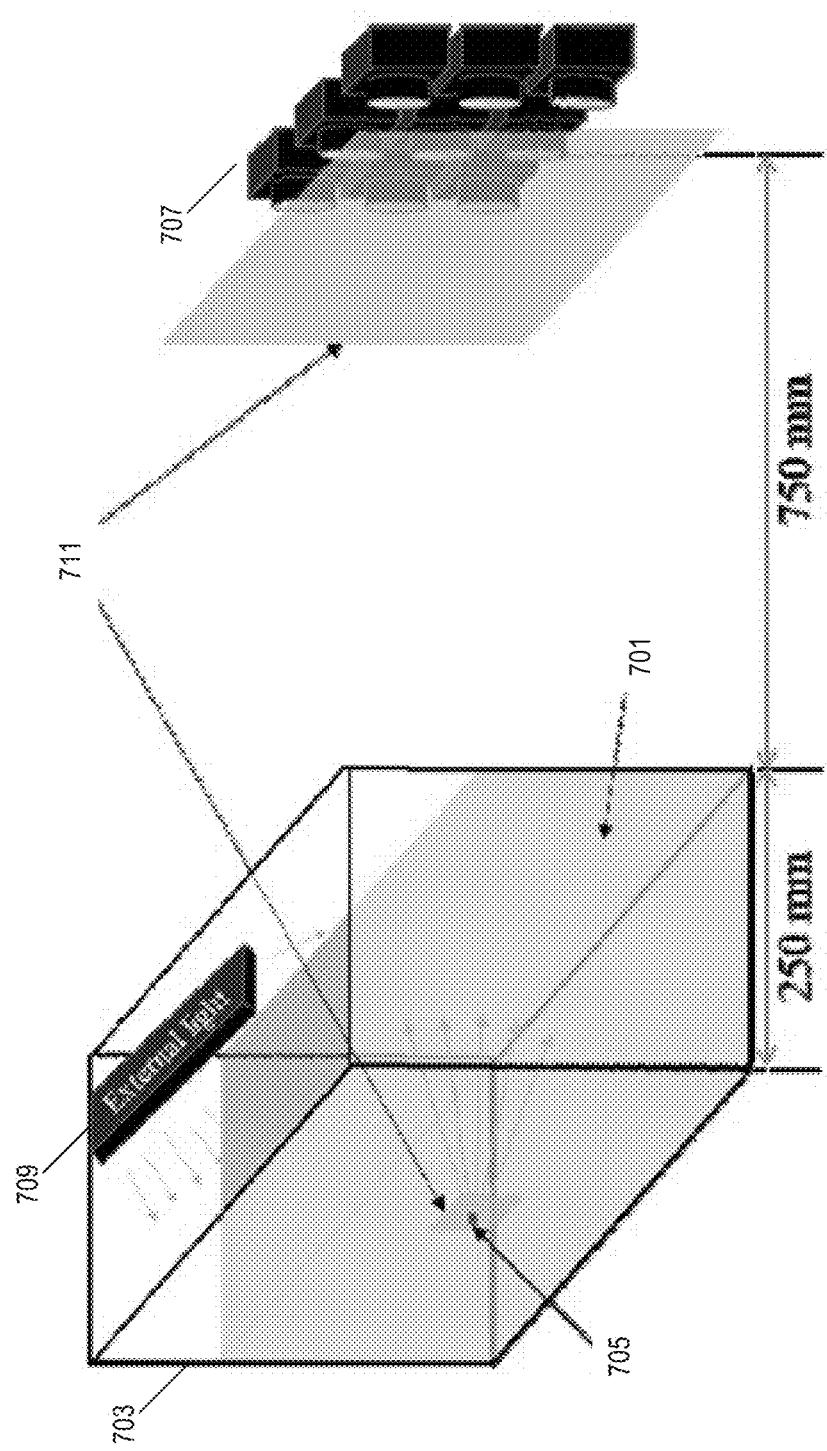
FIG. 7 is a perspective view of another example of an integral imaging system configured to capture video sequences of optical signals sent by a light source.

Experimental Setup: As illustrated in FIG. 7, a turbid underwater environment was created using antacid dissolved in water 701 in a water tank 703. A pseudo-random coded optical signal is transmitted by a blue (467 nm) LED 705 placed at the back of the water tank 703. The optical signal is captured by an array of cameras 707 placed 750 mm from the front of the water tank 703. A white LED array 709 is placed at the top of the water tank to simulate a shallow underwater environment. As described in further detail below, a linear polarizer 711 may be selectively positionable (or fixedly positioned) in the optical path of the array of cameras 707 and/or the blue LED 705.

The size of the water tank 703 was 500(W)×250(L)×250 (H) mm, and it was filled with 25 liters of water 701. The scattering environment was generated by adding various amount of antacid into the water 701. Nine Mako G-192 GigE cameras for integral imaging were utilized, and a 3×3 camera array 707 was used. The horizontal and vertical interval of camera array 707 was 80 mm. The intensity in the underwater environment was measured by an illuminometer and a laser source with a wavelength of 405 nm. The illuminometer was placed in the water at two positions (α and β) inside the tank for measuring the intensity. Table 1 details the measured Beer's coefficient as a function of antacid concentration. The distance between the measuring positions (α and β) was 10 mm.

TABLE 1

Beer's coefficient corresponding
to the amount of Antacid in the water

| Antacid | Beer's Coefficient |
|---|---|
| 0 ml | 0.0015 |
| 25 ml | 0.0497 |
| 50 ml | 0.0789 |
| 75 ml | 0.0964 |
| 100 ml | 0.1096 |
| 125 ml | 0.1236 |
| 150 ml | 0.1449 |
| 175 ml | 0.1765 |
| 200 ml | 0.2294 |

One can compare with conventional 2D sensing and 3D sensing with active polarization descattering using SNR.

Following active polarization descattering of the elemental images, one can further apply turbidity mitigation. The scattering media estimation image ($\hat{\mu}_{ij}$) is calculated using the signal-off image. Although signal off images have only external light scattering, signal on images are mixed with external light scattering and signal light scattering, so signal off images should be used to estimate scattering by external light.

One can choose to estimate the scattering media using the signal-off image because all scattering in this image is caused by the external light 709, whereas the signal-on image also includes scattering caused by the signal light 705 which one may not want to filter out.

After calculated the estimated scattering in the scene $\hat{\mu}_{ij}$, is subtracted from each frames to produce a turbidity-mitigated image. After removal of the scattering, and 3D reconstruction, one can apply 4D correlation for optical signal detection.

A 4D data structure can be constructed using the 3D InIm reconstructed Images at various depths for the duration of the signal transmission. The data structure can be constructed over the coordinates (x,y,z,t) where (x,y) are the spatial coordinates of the reconstructed image, z is the reconstruction depth, and t in frames of the video sequence.

Figure 8:
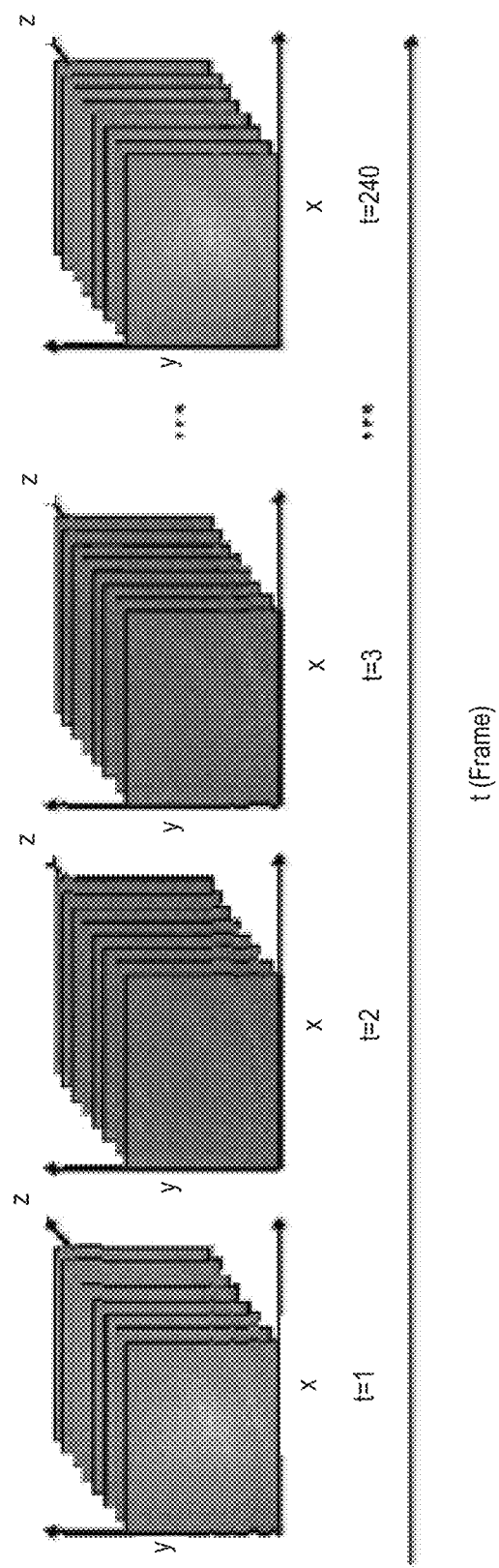
FIG. 8 is a schematic example of a 4D data structure of image data captured by the system of FIG. 7.

FIG. 8 shows 4D data structure. Eight different depths are used in each data structure, and the images were cropped such that the LED is located at the center of x and y axis.

To apply 4D correlation, a 4D reference template data is created assuming that the scattered signal light source follows a Gaussian distribution. Equation (6) is the 4D correlation formula for comparison with reconstructed 4D data ($V_t$) and reference 4D data ($V_r$).

$$C(i, j, k, l) = \Sigma_t \Sigma_z \Sigma_y \Sigma_x V_r(x-i, y-j, z-k, t-l) V_t(x, y, z, t) \quad (6)$$

In this experiment, (x×y)=(400×600) pixel area taken from the center of reconstructed image, and z is 8 different depths including the true depth location. 240 frames $V_t$ were correlated, with 15 frames $V_r$ by 15 frames 16 times. This is because the data is encoded in 15-bit PRS. If the signal is coded normal PRS, the center of the correlation result is the highest, and if the signal is coded inverted PRS, the correlation results are lower than peak of auto-correlation result. For this reason, we recorded the highest value of correlation result in 8th frame was recorded. As a result, one can get the same length result with original data.

Conclusion: In this Example, a method for optical signal detection using 3D sensing with active polarization descattering and turbidity mitigation in scattering media was proposed.

EXAMPLE 3

Multiple Optical Signals Detection in Turbid Water using Multiple Dimensional Integral Imaging Multiple light sources detection in turbid water using passive sensing multi-dimensional integral imaging system and multi-dimensional correlation filter is presented. Multiple optical signals are transmitted using light sources located at the same distance away from an image sensor array and encoded using different pseudorandom sequences (PRS) for each optical signals. The image sensor array is used to acquire elemental images as video sequences, and the video sequences are used to generate multi-dimensional reconstruction data which contains spatial and time domain. Multi-dimensional correlation is applied to detect the multiple light sources signal. The experiments show that the multiple optical signals coded by different PRS can be detected successfully. Some advantages are improving the performance including speed and bandwidth of the detection.

Detecting an optical signal in turbid media such as sea water or fog is of particular interest in applications including marine survey, communication under adverse conditions. Optical signals cannot propagate as far as acoustic wave due to absorption and scattering in turbid media however optical signal propagates faster and can be achieved wider bandwidth than acoustic wave. To increase the effective channel capacity of the signal transmitting, using multiple optical signals is one of a realistic scenario likewise increasing transmitting speed of the optical signals.

Multiple optical signals detection enables independent detection with multiple senders, which is multiple access, in addition to increasing the effective channel capacity. Multiple optical signals detection has been reported in an automotive industry field for traffic control using LED traffic lights or LED rear lights. Using a conventional single pixel sensor, the detected signal is not able to separate the multiple optical signals due to lacking two-dimensional (2D) information. On the other hand, using a conventional 2D imaging system multiple optical signals can be detected in clear water but the signals are scattered due to the scattering in the turbid media and cannot be detected each signals separately.

Recently, a method based on passive three-dimensional integral imaging (3D InIm) for video sequence and four-dimensional (4D) correlation has been reported. The 3D InIm is a passive sensing and visualization technology that captures multiple perspective images of a scene using a lenslet array. By replacing the lenslet array with a camera array or a moving camera, high resolution 3D reconstructed image can be generated, which method is especially called synthetic aperture integral imaging (SAII).

The captured multiple perspective images, known as elemental images (EIs), are used for 3D image reconstruction which is performed optically and computationally. The 3D reconstructed image demonstrated improved signal-to-noise ratio (SNR), and is optimal in the maximum-likelihood sense for the noise is additive Gaussian noise.

The computational 3D reconstruction is performed for the captured video sequences, the 4D reconstructed data, which contains the 3D reconstructed images plus temporal domain, is generated. Performing 4D correlation using pseudorandom sequence (PRS) information, the transmitted optical signals are detected robustly. In this method, the transmitted optical signal is from only one point source, therefore, the effective channel capacity for the optical signal transfer is narrow.

In this Example, multiple optical signals detection for increasing channel capacity using multiple light sources coded by different PRSs for different light sources and multi-dimensional spatial and temporal domains integral imaging is proposed.

The optical signals are transmitted using a LED array and each LED signals is coded by different PRS. This transmitted signal sequences are captured by a camera array and each cameras captures EIs as a video sequence. The 3D computational reconstruction is performed to the captured video sequences improving SNR according to maximum likelihood sense, and the 4D reconstructed data is generated.

The 4D correlation is applied to the 4D reconstructed data to detect the transmitted multiple optical signals robustly. The proposed multi-dimensional detection method may be able to detect the multiple optical signal correctly in heavy turbidity conditions whereas the conventional method may be fail.

A PRS is used for robust temporal signal detection as is the case for code division multiple access or spread spectrum. In the experiments, multiple optical signals are transmitted using LEDs and each signals are coded by a 15-bit PRS generated by linear feedback shift register.

By separating each optical signal, different PRSs can be used for each optical signal and the 15-bit PRSs can be generated by shifting their initial register conditions. Auto-correlation derives higher peak values and there is no peak for cross-correlation. As a result, each light source signal can be detected separately. When the data is 1, the generated 15-bit PRS is transmitted, on the other hand, an inverted 15-bit PRS is transmitted when data is 0.

The encoded transmitted optical signals are scattered on whole images and the detected intensity on the image sensor depends on how many LEDs are turned on at each time frame. When the transmitted optical signals coded by same PRS for all LEDs in turbid water, the intensity pattern from the optical signals on the images during one sequence which is 15-bit are depended on how many optical signals are 1.

Applying linear correlation filtering for signal detection, a correlation value depends on the image intensity, which means that the correlation value is depended on how many optical signals are 1 rather than data value of each optical signals. When one checks a particular area located on an LED, the correlation value at the area is affected by the number of LEDs sending data 1 during one sequence. Therefore even if the LED send data 0 the correlation value can be high when other LEDs send data 1.

In another 15-bit sequence, when the same LED send data 1 and other LEDs send data 0, this case the correlation value at the LED area might be lower than aforementioned case despite sending 1.

On the other hand, applying deferent PRSs which are orthogonal to each LEDs, the intensity of the whole captured image is almost same at each frames even if all LEDs send 1 or 0. Other LEDs signals do not affect the other one LED data detection when the 4D correlation is applied with its particular 15-bit PRS. The 4D correlation value at other LEDs area is stable but the 4D correlation value at particular LED position changes depending on send data value.

Therefore, the LED position on the captured image is not necessary. Checking fluctuation of mean value of the 4D correlation for a region of interest (ROI) which is an overlapping area of all camera images, the sent signals are identified as 1 or 0. When the reference 15-bit PRS is changed, the sent signals of a different LED can be detected.

In the experiments, six LEDs were used as a transmitter of the optical signals.

Figure 9A:
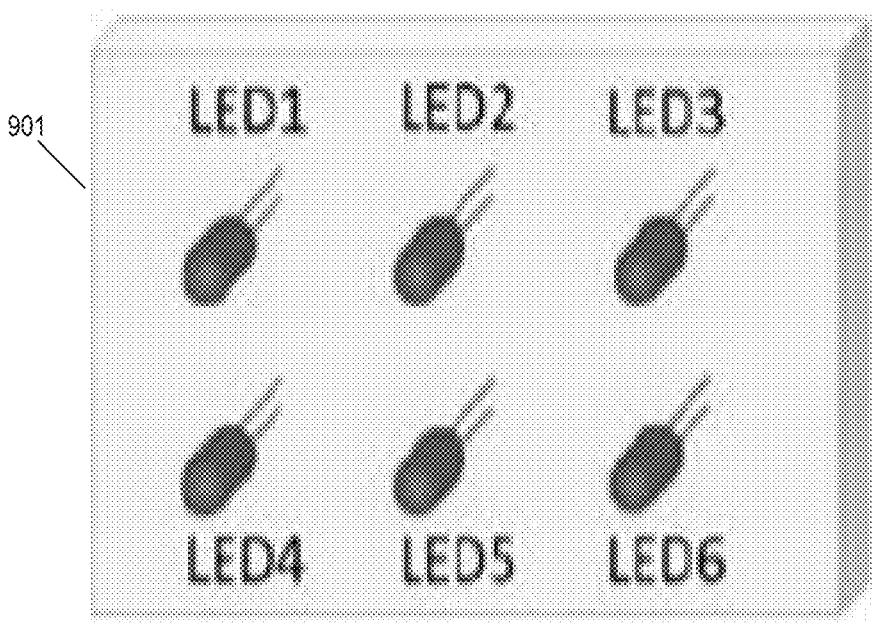
FIG. 9A is a perspective view of an example of an LED array arrangement for use in some implementations of the systems of FIG. 1C and FIG. 7.
Figure 9B:
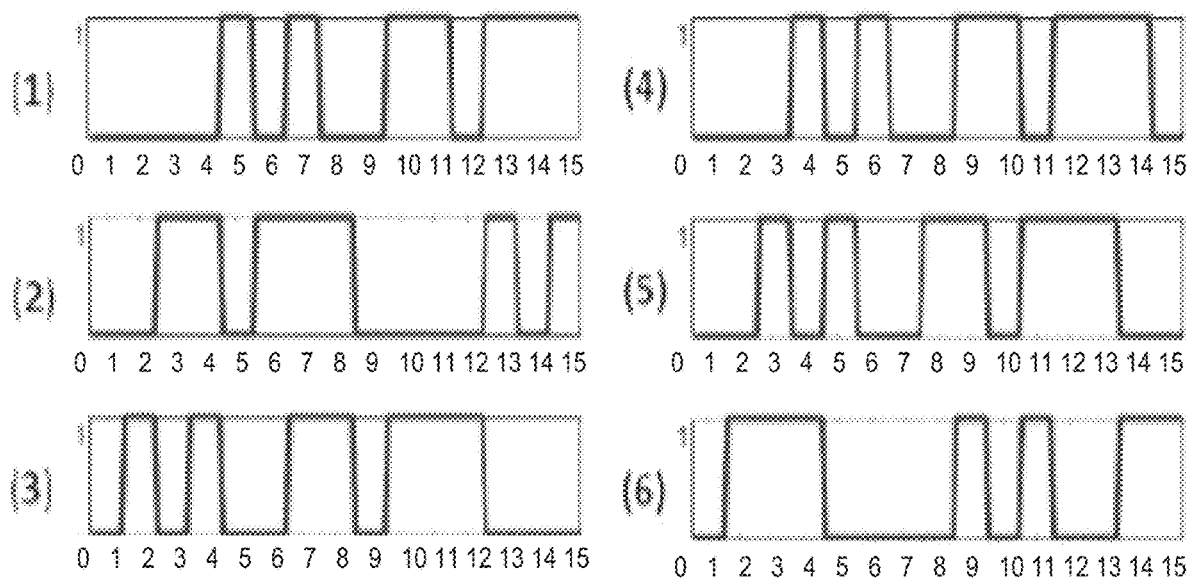
FIG. 9B is a series of graphs of a 15-bit pseudorandom signal sequence for each LED in the LED array of FIG. 9A.

FIG. 9A illustrates a LED array 901 for transmitting the optical signals, and FIG. 9B is the shifted PRSs corresponding to each LEDs. The each temporal optical signals contains 600-bit length sequence which is consisted of 40-bit data coded by 15-bit PRS, and total 240-bit data was transmitted by using 6 LEDs.

To detect the multiple optical signals, the 3D InIm technique which is consisted of a camera array is used for capturing EIs of a scene in turbid water, improving SNR under additive Gaussian noise condition.

Furthermore, each EIs has a different perspective of the scene allowing for an increased number of ballistic rays and a highest LED intensity value appears on the 3D reconstructed image at the LED distance comparing to other distance. The computational reconstruction process is the inverse process of the capturing EIs.

FIG. 10A shows another example of the operation of the system for capturing image data of an optical signal generated by a light source 1001 (e.g., one or more blue LEDs). Light generated by the light source 1001 travels through the water to a lens array 1003 where it is focused and captured by each image sensor in an image sensor array 1005. FIG. 10B illustrates a pin-hole model and ray back-projection used to generate 3D image data from the plurality of elemental images captured by the sensor array 1005. As shown in FIG. 10B, based on the pinhole model and ray back-projection from EIs, pixels on each elemental image (EI) 1011 pass through their corresponding virtual pinhole 1013 and overlap at reconstruction distance in the 3D space. Objects at reconstruction distance are in focus on the reconstructed image 1015, while objects at other distance are out of focus. This computational 3D reconstruction is applied to the captured video sequence, then 4D reconstruction data, denoted as $I_r(x,y,z,t)$, is generated as following:

$$I_r(x, y, z, t) = \frac{1}{O(x.y.z.t)} \sum_{k=0}^{K-1} \sum_{l=0}^{L-1} (EI_{k,l}(x - kd_x, y - ld_y, t)) \quad (7)$$

$$d_x = \frac{N_x P_x f}{C_x z}, \, d_y = \frac{N_y P_y f}{C_y z} \quad (8)$$

where (x,y) is the pixel index, z is the reconstruction distance which is denoted by $z=z_{air}+z_w/n_w$, where $Z_{air}$ is the distance between the camera and the water tank surface, $z_w$ is the distance between the water tank surface and the LED array, and $n_w$ is the refraction index of water, t represents the frame index, O(x,y,z,t) is the image overlapping number on (x,y,z,t), K and L are the total number of EIs in the k-th column and the l-th row, $EI_{k,l}$ is the k-th column and the l-th row EIs, $N_x$ and $N_y$ are the total number of pixels in each column and row on images, $P_x$ and $P_y$ are the pitch between image sensors, $C_x$ and $C_y$ are the size of the image sensor, and f is the focal length.

The optical signal detection experiments in turbid water were carried out under different concentrations of turbid water. A cameras array consisting of 9 Allied Vision Mako G-192 GigE cameras with Ricoh 20 mm F1.8 lenses each having a pixel size of 4.5 μm square and resolution of 1600(H)×1200(V) pixels was used.

For the integral imaging setup, a 3×3 camera array was used with a camera pitch of 80 mm for both horizontal and vertical directions. The exposure time was set to 10 ms and the frame rate was 20 fps. The camera array was located 750 mm away from the surface of a water tank.

The water tank dimensions were 500(W)×250(L)×250(H) mm. A blue LED array which has 2×3 LEDs was used as the light source for the communication transmitter and was located just behind the water tank and a blue color channel image was used for the optical signal detection.

Five different concentrations of turbid water scenes were made by mixing 25 liters of pure water with 20 ml to 100 ml of liquid antacid. To quantify the attenuation of light as it propagates through the medium, the Beer-Lambert law, $I=I_0 \exp(-\alpha d)$ was used, where $I_0$ is a reference intensity, I is the intensity after propagating a distance d, and $\alpha$ denotes the amount of absorbance.

Figure 11A:
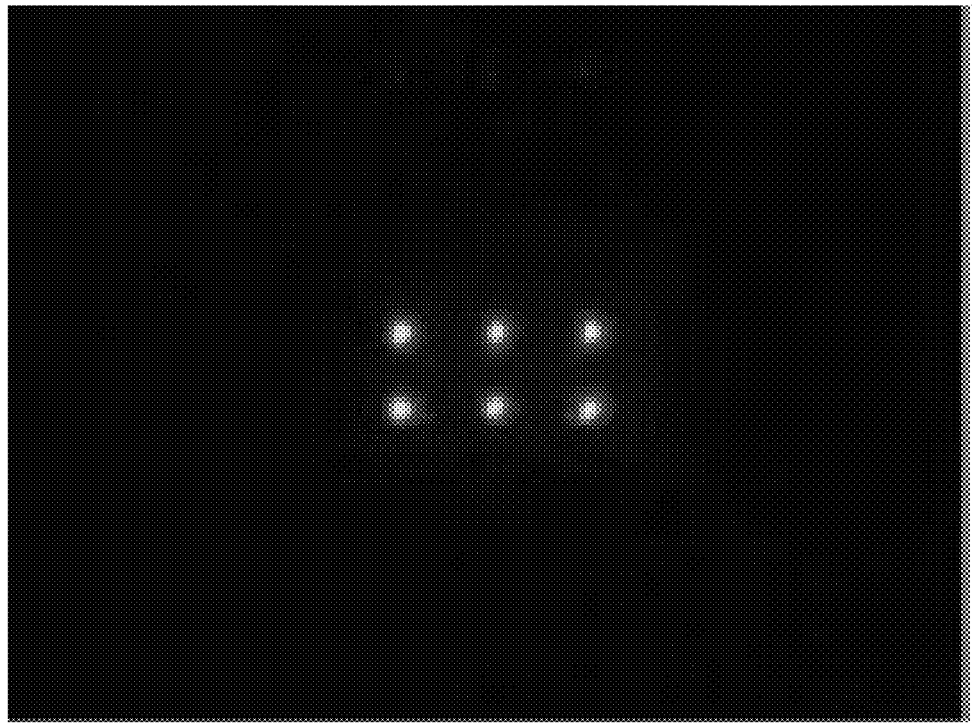
FIG. 11A is an example of an elemental image captured by the system of FIG. 7 of the LED array of FIG. 9A in clear water.
Figure 11B:
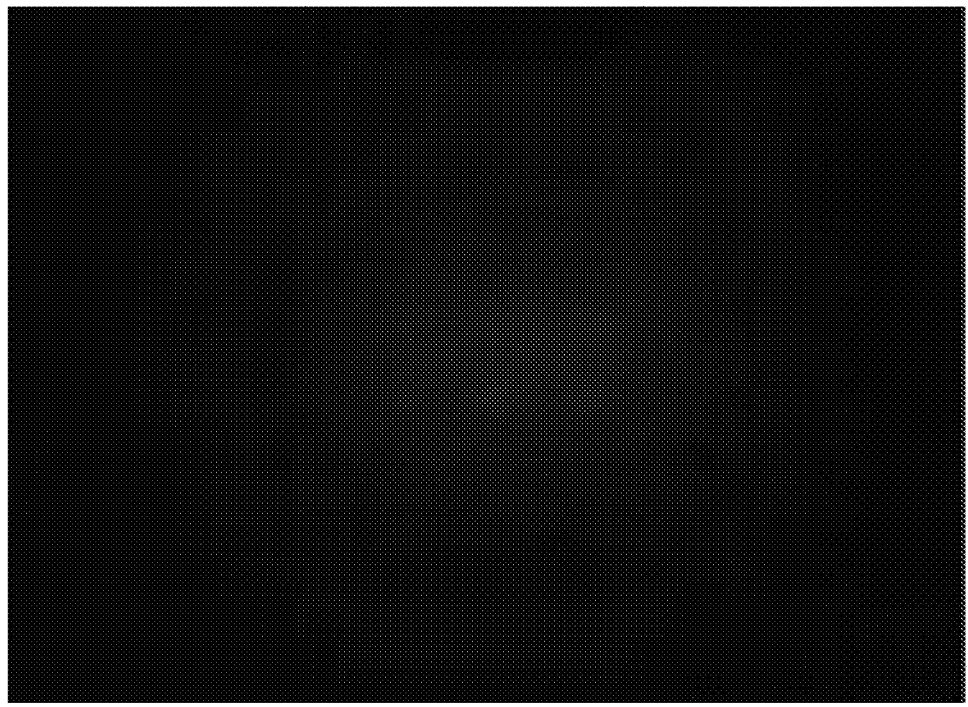
FIG. 11B is an example of an elemental image captured by the system of FIG. 7 of the LED array of FIG. 9A in turbid water (Beer-Lambert law coefficient $\alpha=0.035$).

For the aforementioned experiment, $\alpha$ was varied between 0.035 and 0.110. Sample EIs of the LED array in clear water is shown in FIG. 11A and in turbid water, in which the concentration is $\alpha=0.035$, is shown in FIG. 11B.

In the turbid water condition, the light from the LED array are scattered by the antacid particles. Total 600 frames video sequences were captured by the camera array with 9 cameras and the 3D reconstructed images were generated with 8 different distance, which interval was 20 mm, at each frames. As a result, 4D reconstructed data was generated which dimensions were 10 x=1200 pixels, y=1600 pixels, z=8 layers, and t=600 frames. A 400×600 pixels area in x, y domains, that is the overlapping area of the 9 camera images, was cropped as a region of interest (ROI).

In optical signal detection, 4D correlation is applied in 3D spatial domain plus time domain, that is (x, y, z, t), after the 3D reconstruction to detect the encoded transmitted optical signals. The length of the encoded transmitted optical signals is 600-bit and the original data length is 40-bit due to the 15-bit PRS coding.

Six different 15-bit PRSs are used and each 15-bit PRSs is separately extracted using the 4D correlation from the reconstructed 4D volume data $V_t(x, y, z, t)$ assuming the start frame is known. A 4D reference data $V_r(x, y, z, t)$ is numerically generated where frames with LED turned on based on PRS contains a uniform circular shape that imitates the shape of the LED light source. Five pixels was used as a radius to model the light source distribution. The optical signal coding with different PRSs can be achieved separate signal detection from mixed signals by turbidity. When different PRSs with their range [0, 1] are used, the correlation values v at the center frame when sending data 1 are follows:

$$v = \begin{cases} 1 & \text{(same sequence)} \\ 1/2 & \text{(different sequence)} \end{cases} \quad (9)$$

Also, when data) is sent the correlation values v are as follows:

$$v = \begin{cases} 0 & \text{(flipped same sequence)} \\ 1/2 & \text{(different sequence)} \end{cases} \quad (10)$$

Therefore, a higher correlation peak can be appeared at one of the LED position at x-y dimensions when the sent PRS is same as the reference PRS, and the correlation value at other areas can be lower value than the LED area.

Furthermore the highest correlation peak is appeared at distance where the LED is located in z dimension. On the other hand, when the flipped PRS is sent, which means data 0 is sent, relatively lower correlation value is appeared at the LED position comparing to other area at x-y dimensions.

The correlation value except for the particular LED area could always be the same uniform value because the correlation values with the different PRSs are same based on Eq.(9) and Eq.(10) and the turbid water causes scattered optical signals uniformly in the ROI. The optical signals from different LED can be detected changing the reference PRS for correlation.

In heavy turbid water, the light source position might not be detected clearly; however, the optical signals from the different light source can be detected separately. When the 4D correlation is carried out using one of the PRSs, the high correlation peak can be appeared at a center frame $t_c$ of the time domain and corresponding position of the LED in the spatial domain when data is 1.

As a result, even if the LED positions in (x, y, z) space are unknown, difference of the received data value can be detected by calculating mean value of the correlation value in the ROI.

Finally, by determining the optimal threshold value, the received data can be distinguished as 0 or 1. The optimum threshold is calculated by moving a straight line with slope, which is calculated by using false-positive cost, false-negative cost and prevalence, from the upper left corner of the receiver operating characteristic (ROC) curve.

Experiments compared the signal detection performances between 2D sensing system of PRS signals (x, y, t), and the proposed multidimensional (x, y, z, t) system using the integral imaging reconstruction of captured PRS signals. ROC curve was calculated in five different turbidity conditions, and area under the curve (AUC) was evaluated to compare the two systems.

Figure 12A:
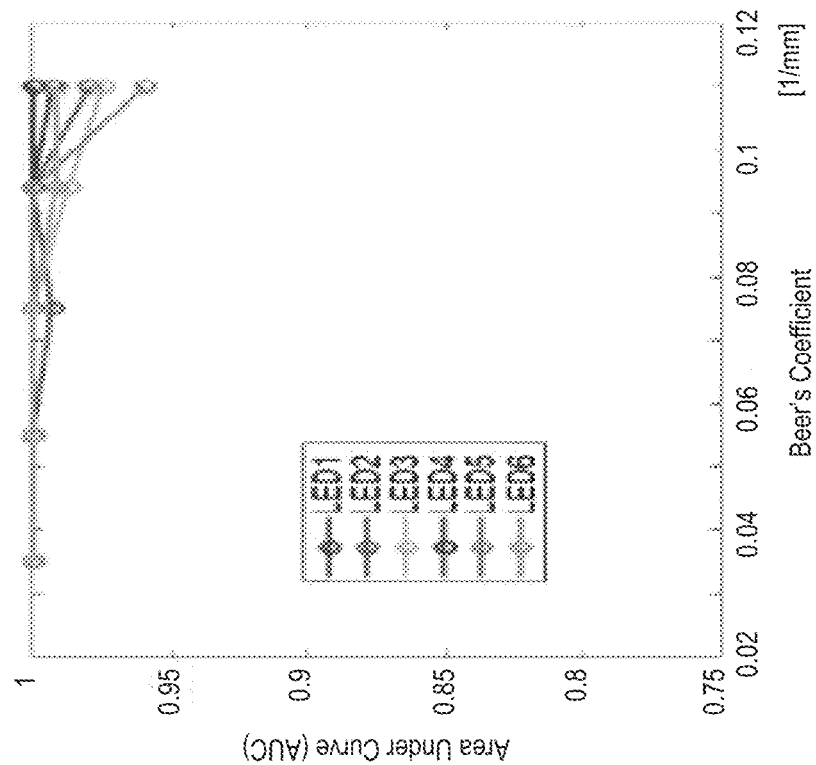
FIG. 12A is a graph of "area under curve" for 3D correlation using a sequence of elemental images for each of a plurality of different water turbidity conditions.
Figure 12B:
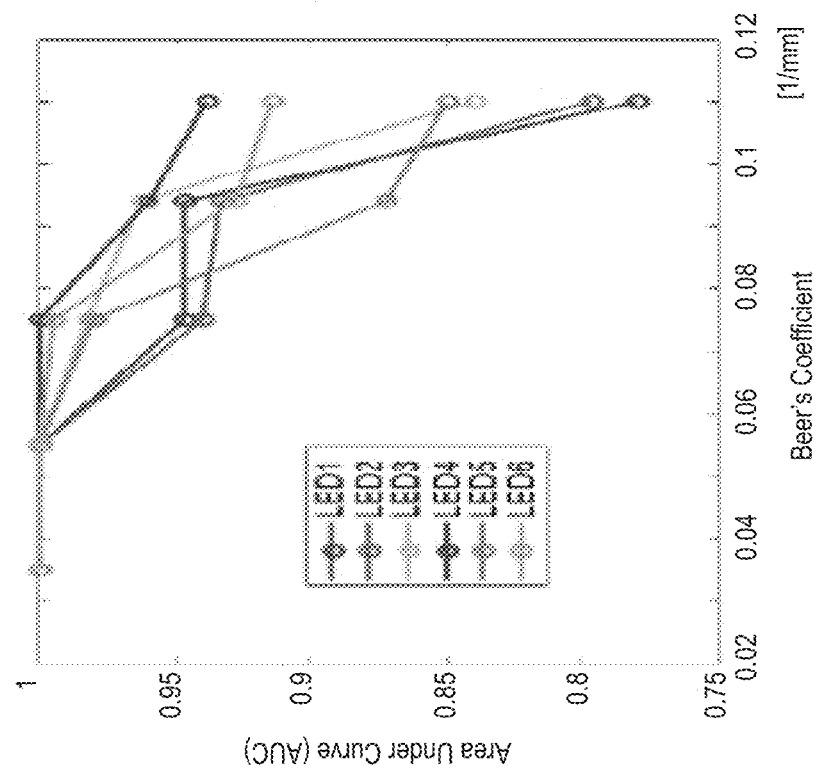
FIG. 12B is a graph of "area under curve" for a 4D correlation process using a sequence of 3D reconstructed images for each of a plurality of different water turbidity conditions.

FIGS. 12A-12B show the AUC according to Beer's coefficient, different LED results are shown using different color line. The AUCs of the 2D sensing system, shown in FIG. 12A, sharply decline according to turbidity while the AUCs of the proposed system are maintained at a higher value. Moreover, the proposed system maintains high AUCs regardless of LED position. The proposed system using multiple light sources coded by different PRSs for different light sources and multi-dimensional spatial and temporal domains integral imaging has achieved multi optical signals detection in turbid water.

FIG. 13A illustrates one example of a method for detecting optical signals using integral imaging technologies based on the examples described above. First, a signal is generated by a light source and transmitted through water (e.g., turbid water) (step 1301). The light source is oriented relative to an image sensor array such that the transmitted signal enters a field of view of the sensor array. Image data is captured by the sensor array containing the optical signal (step 1303) and turbidity mitigation is applied to the captured image data (step 1305). A 3D reconstruction technique is applied to the captured image data (step 1307) and 4D correlation is then used to extract the optical signal from the captured image data (step 1309).

FIG. 13B illustrates a more specific example of the method of FIG. 13A. In this example, a time-modulated pulsed signal is generated by pulsing a light source on/off (step 1321). Elemental images are captured by the image sensor array of the integral imaging system (step 1323). Turbidity mitigation is applied by subtracting an "estimated turbidity image" (ETI) from the captured elemental images (step 1325). Three-dimensional image data is then reconstructed from the turbidity-mitigated image data for each temporal frame of the captured image data (step 1327). The reconstructed 3D images combined provide a four-dimensional data structure (i.e., 3D video sequence) (step 1329) and 4D correlation analysis is applied to detect the source signal in the reconstructed 3D data video sequence (step 1331).

Figure 14:
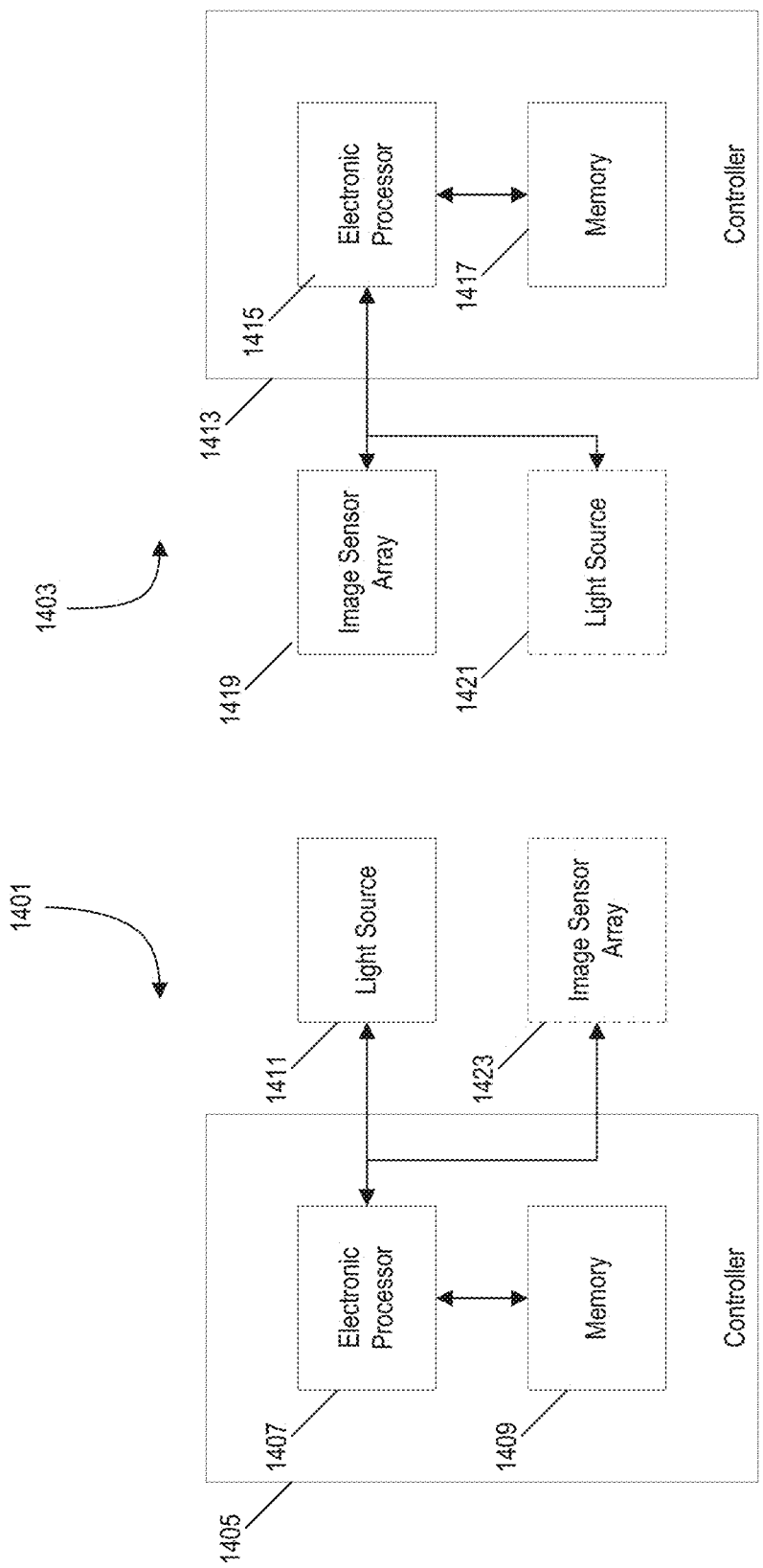
FIG. 14 is a block diagram of an integral imaging system configured to perform the method of FIG. 13A and/or FIG. 13B.

FIG. 14 illustrates an example of a system configured to provide the optical signal generation and detection using the mechanism described in the examples above. In the example of FIG. 14, an optical signal is generated by a first communication device 1401 and is detected by a second communication device 1403. The first communication device 1401 and the second communication device 1403 can, in some implementations, be implemented on two difference vehicles or other systems operating in a water environment (e.g., the AUVs of FIG. 1A).

The first communication device includes a controller 1405 with an electronic processors 1407 and a non-transitory computer-readable memory 1409. The memory 1409 is communicatively coupled to the electronic processor 1407 and stores data and instructions that are executed by the electronic processor 1407 to provide the functionality of the first communication device 1401. The first communication device 1401 also includes a light source 1411 that is communicatively coupled to the controller 1405. The controller 1405 is configured to operatively control the light source to generate a time-modulated optical signal by pulsing the light source 1411 on and off.

The second communication device 1403 also includes a controller 1413 with an electronic processor 1415 and a non-transitory computer-readable memory 1417. The second communication device 1403 includes an image sensor array 1419 that is communicatively coupled to the controller 1413 and configured to capture elemental images including the optical signal generated by the first communication device 1401. In some implementations, the controller 1413 is configured to process the captured image data and to extract the source signal from the image data. In other implementations, the controller 1413 includes a wired or wireless communication interface and is configured to transmit the image data via the communication interface to another remote system where the captured image data is processed to extract the source signal from the first communication device 1401.

In some implementations, the first communication device 1401 is configured to transmit the optical signal while the second communication device 1403 is configured to capture and extract the optical signal from captured image data. In other implementations, the first communication device 1401 and the second communication device 1403 may be configured for two-way optical communication by equipping the first communication device with an image sensor array 1423, equipping the second communication device 1403 with a light source 1421 and configuring both the first communication device 1401 and the second communication device 1403 to transmit optical signals and to extract the source signal from captured image data.

In summary, a multiple signals detection approach under turbid water using multi-dimensional integral imaging to improve bandwidth or to achieve multiple access was presented. Multiple signal detection in heavy turbidity conditions may be possible using different pseudorandom sequences and the temporal and spatial domains reconstructed data with integral imaging. Multi-dimensional spatial-temporal domains (x, y, z, t) correlation was used to detect the signals encoded using multiple pseudorandom sequences. Future work includes using high speed imaging, and achieving wider bandwidth.

Although the systems/methods of the present disclosure have been described with reference to exemplary embodiments thereof, the present disclosure is not limited to such exemplary embodiments/implementations. Rather, the systems/methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method for optical sensing and detection, the method comprising:
    positioning a light source and an image sensor array in turbid media or external to turbid media, the light source within a field of view of the image sensor array;
    transmitting, by the light source, temporal optical signals through the turbid media;
    acquiring, by the image sensor array, multiple perspective video sequence frames of light propagating through the turbid media;
    reconstructing a three-dimensional image from each frame;
    combining the reconstructed three-dimensional images to form a three-dimensional video sequence; and
    detecting the transmitted optical signals from the three-dimensional video sequence by applying a multi-dimensional signal detection scheme.

2. The method of claim 1, wherein the transmitted temporal optical signals are codes designed for communication.

3. The method of claim 1, wherein the multi-dimensional signal detection scheme is a four-dimensional correlation filter.

4. The method of claim 1, wherein the image sensor array includes a one dimensional array of cameras.

5. The method of claim 1, wherein the image sensor array includes a randomly distributed array of cameras.

6. The method of claim 1, wherein the light source is a single wavelength light source.

7. The method of claim 1, wherein the image sensor array is a one dimensional line array having sensors.

8. The method of claim 1, wherein the image sensor array includes multiple spectral band sensors.

9. The method of claim 1, wherein the turbid media is turbid water or fog.

10. The method of claim 1, wherein the light source is a LED light source.

11. The method of claim 1, wherein the image sensor array is a camera array having CMOS sensors.

12. The method of claim 1, wherein the optical signals sent through the turbid media are coded by pseudo-random sequences.

13. The method of claim 1, wherein the three-dimensional video sequence is a four-dimensional data volume having spatial and time domains.

14. The method of claim 1, wherein the transmitted optical signals are time modulated light signals.

15. The method of claim 1, wherein the image sensor array includes one or more cameras.

16. The method of claim 1, wherein the image sensor array includes one or more camera arrays.

17. The method of claim 1, wherein a dominant wavelength of the light source is adapted for optimum penetration through turbid media.

18. The method of claim 1, wherein after acquiring multiple perspective two-dimensional video sequence frames of light propagating through the turbid media via the image sensor array, scattering removal by active polarization descattering is applied in order to remove scattered photons.

19. The method of claim 1, wherein the light source is a polarized light source.

20. The method of claim 1, wherein a linear polarizer is positioned in front of the image sensor array.

21. The method of claim 1, wherein a linear polarizer is positioned in front of the light source.

22. The method of claim 1, wherein the reconstruction and detection steps are performed locally.

23. The method of claim 1, wherein the reconstruction and detection steps are performed remotely.

24. The method of claim 1, wherein the image sensor array is a camera sensor array that is positioned so that the light source is partially or completely in the field of view of the camera sensor array.

25. The method of claim 1, wherein a dominant wavelength of the light source is adapted for optimum penetration through water.

26. The method of claim 1, wherein the light source is positioned out of the turbid media, and the image sensor array is positioned in the turbid media.

27. The method of claim 1, wherein the image sensor array is positioned out of the turbid media, and the light source is positioned in the turbid media.

28. The method of claim 1, wherein the light source can move relative to the turbid media, and the image sensor array is stationary relative to the turbid media.

29. The method of claim 1, wherein the image sensor array can move relative to the turbid media, and the light source is stationary relative to the turbid media.

30. The method of claim 1, wherein the light source is within a field of view of a subset of cameras of the image sensor array.

31. The method of claim 1, wherein the light source and the image sensor array are positioned external to the turbid media.

32. The method of claim 1, wherein the light source and the image sensor array are positioned at arbitrary distances from one another in the turbid media or external to the turbid media.

33. A method for optical sensing and detection, the method comprising:
- positioning a light source and an image sensor array in non-turbid media or external to non-turbid media, the light source within a field of view of the image sensor array;
- transmitting temporal optical signals through the non-turbid media via the light source;
- acquiring multiple perspective video sequence frames of light propagating through the non-turbid media via the image sensor array;
- reconstructing a three-dimensional image from each frame;
- combining the reconstructed three-dimensional images to form a three-dimensional video sequence; and
- detecting the transmitted optical signals from the three-dimensional video sequence by applying a multi-dimensional signal detection scheme.

* * * * *